United States Patent [19]

Nishiyama et al.

[11] Patent Number: 4,864,528

[45] Date of Patent: Sep. 5, 1989

[54] ARITHMETIC PROCESSOR AND MULTIPLIER USING REDUNDANT SIGNED DIGIT ARITHMETIC

[75] Inventors: Tamotsu Nishiyama; Shigeo Kuninobu, both of Osaka; Naofumi Takagi, Kyoto; Takashi Taniguchi, Osaka, all of Japan

[73] Assignee: Matsushita Electric Industrial Co., Ltd., Osaka, Japan

[21] Appl. No.: 74,971

[22] Filed: Jul. 17, 1987

Related U.S. Application Data

[63] Continuation-in-part of Ser. No. 66,817, Jun. 25, 1987, which is a continuation-in-part of Ser. No. 70,565, Jul. 7, 1987, which is a continuation-in-part of Ser. No. 74,892, Jul. 17, 1987.

[30] Foreign Application Priority Data

Jul. 18, 1986 [JP] Japan .................. 61-170020
Sep. 12, 1986 [JP] Japan .................. 61-216592
Jan. 23, 1987 [JP] Japan .................. 62-14517

[51] Int. Cl.4 ..................... G06F 7/49; G06F 7/52
[52] U.S. Cl. ......................... 364/754; 364/760
[58] Field of Search ............ 364/754, 760, 761, 768

[56] References Cited

U.S. PATENT DOCUMENTS 4,745,570 5/1988 Diedrich et al. ............... 364/760

OTHER PUBLICATIONS

A VLSI-Oriented High-Speed Divider Using Redundant Binary Representation, Takagi et al, IECE, Japan, vol. 67, D. #4, pp. 450–457, 4/84.
A VLSI-Oriented High-Speed Multiplier Using Redundant Binary Adder Tree, Takagi et al., IECE, Japan, vol. J66.d, pp. 683–690, 6/84.
A New Class of Digital Division Methods, James Robertson, IRE Transactions on Electronic Computers, pp. 218–222, 9/58.
Signed-Digit Number Representations for Fast Parallel Arithmetic, Avizienis, IRE Transactions on Electronic Computers, pp. 389–400, 9/61.
A Class of Binary Divisions Yielding Minimally Represented Quotients, Metze, IRE Transactions on Electronic Computers, pp. 761–764, 12/62.
Design of the Arithmetic Units of ILLIAC III, Redundancy & Higher Radix Methods, Atkins, IEEE Transacts. on Computers, vol. C-19, pp. 720–732, 8/70.
Multiple Operand Addition and Multiplication, Shanker Singh et al., IEEE Transactions on Computers, vol. C-22, pp. 113–120, 2/73.
Concise Papers, Lyon, IEEE Transactions on Communications, pp. 418–425, 4/76.
Real-Time Processing Gains Ground with Fast Digital Multiplier, Waser et al., Electronics, pp. 93–99, 9/77.
High Speed Multiplier Using a Redundant Binary Adder Tree, Harata et al., IEEE International Conference on Computer Design, pp. 165–170, 1984.
High Speed VLSI Multiplication Algorithm with a Redundant Binary Addition Tree, Takagi et al., IEEE Transactions on Computers, vol. C-34, No. 9, pp. 1789–1795, 9/85.
Design of High Speed MOS Multiplier and Divider Using Redundant Binary Representation, Kuninobu et al., Proceedings 8th Symposium on Computer Arithmetic, pp. 80–86, 5/87.
Avizienis, "Binary-Compatible Signed-Digit Arithmetic", *Proceedings–Fall Joint Computer Conference*, 1964, pp. 663–672.
Tung, "Division Algorithm for Signed-Digit Arithmetic", *IEEE Trans. on Computers*, Sep. 1968, pp. 887–889.

*Primary Examiner*—David H. Malzahn
*Attorney, Agent, or Firm*—Amster, Rothstein & Ebenstein

[57] ABSTRACT

A high speed processor including a multiplier is disclosed. The multiplier includes a multiplier recorder circuit which may record multipliers in groups of digits, and intermediate partial product generators which generate partial products from the recorded digits and a multiplicand. Addition/subtraction is then carried out on the intermediate partial products generated by the partial product generators. The processor may operate using signed digit expressions.

24 Claims, 14 Drawing Sheets

ARITHMETIC PROCESSOR AND MULTIPLIER USING REDUNDANT SIGNED DIGIT ARITHMETIC

RELATED APPLICATIONS

This is a continuation-in-part of Application Ser. No. 066,817 filed June 25, 1987 entitled "Arithmetic Processor Using Redundant Signed Digit Arithmetic," Application Ser. No. 070,565 filed July 7, 1987 entitled "Arithmetic Processor and Divider Using Redundant Signed Digit Arithmetic," and Application Ser. No. 074,892 entitled "Arithmetic Processor And Divider Using Redundant Signed Digit Arithmetic" filed concurrently herewith, the disclosures of which are incorporated herein by reference.

BACKGROUND OF THE INVENTION

The present invention relates to an arithmetic processor and, more particularly, to a high speed arithmetic processor and multiplier thereof which provides multiplication for internal arithmetic operations, and may be implemented by LSI.

A high speed binary multiplier utilizing a redundant binary adder tree is discussed on pages 683 to 690 of *Trans. of IECE Japan*, Vol. J66-D, No. 6 (1983). That multiplier utilizes a redundant binary expression (a kind of signed digit ("SD") expression) in which each digit is represented by an element of the set $\{-1, 0, 1\}$. In n-bit multiplication, n n-bit partial products, considered as redundant binary numbers, are added by partial trees in units of two in the redundant binary number system, and the product which is obtained as a redundant binary expression is converted to an ordinary binary expression. In the redundant binary number system, addition of two numbers without carry-propagation can be performed within a predetermined time irrespective of the number of digits to be added. Accordingly, a multiplier utilizing redundant binary adder trees is capable of executing n-bit multiplication at high speed in the computation time of log n. Computation speed is as high as that of a high speed multiplier utilizing Wallace trees, and is considerably higher than a prior art array multiplier. In addition, a regular array circuit structure is utilized, as in the case of an array multiplier, and with a simpler fan out arrangement than a multiplier using Wallace trees.

Use of the 2-bit Booth method reduces hardware requirements in the multiplier described above. In the 2-bit Booth method, the number of partial products may be reduced by almost half by recoding the multiplier in the quaternary signed digit number system, in which each digit is represented by an element of the set $\{-2, -1, 0, 1, 2\}$, which provides high speed operation and reduces the amount of hardware required. However, double folding of the multiplicand, which folding may be realized by left-shifting one bit, and inversion of positive and negative signs are necessary to generate a partial product. The inversion of positive and negative signs may be executed by obtaining a 2's complement binary number or by setting the "1" digits of the multiplicand to "−1" using the fact that inversion of positive and negative redundant binary numbers can be realized by inversion of the positive and negative signs of each digit.

Although the multiplier can easily generate a partial product, since each digit of the partial product may be positive (e.g., "1"), zero ("0") or negative (e.g., "−1"), it has been necessary to form all stages of the adder tree with the same ordinary redundant binary adder cells. No consideration, however, has been given to practical problems in the implementation of the multiplier, such as reducing the large number of elements (about 50 transistors) required, simplifying circuit structure in view of the large number of individual cells needed to form a redundant binary adder, and the difficulty in implementing the cells utilizing combinational circuitry since the number of elements required increases with the number of digits involved in the arithmetic operations which in turn requires complicated circuit structures.

OBJECTS AND SUMMARY OF THE INVENTION

It is an object of the present invention to provide a high speed arithmetic processor and multiplier thereof which avoid the problems described above.

It is another object of the present invention to provide a high speed arithmetic processor and a multiplier thereof utilizing combinational circuitry.

It is another object of the present invention to reduce the number of elements (e.g., transistors) in a multiplier.

It is another object of the present invention to provide a multiplier which prevents carry-propagation in arithmetic addition and subtraction.

It is another object of the present invention to provide a multiplier which may be fabricated on an LSI chip.

It is another object of the present invention to provide a multiplier having a reduced number of stages of gates through simplification of circuit structure.

According to the present invention, an arithmetic processor is provided comprising first generating means for generating first intermediate partial products from a first group comprising a plurality of digits of a multiplier and a multiplicand, second generating means for generating second intermediate partial products from a second group comprising a plurality of digits of the multiplier and the multiplicand, and third generating means for generating partial products from intermediate partial products generated by the first and second generating means. The first group may comprise substantially half of the digits of the multiplier and the multiplicand, and the second group may comprise substantially the other half of the digits of the multiplier and the multiplicand. For example, the first group may comprise even digits and the second group odd digits.

The first generating means may comprise a first multiplier recoder means and a first partial product generating means for generating the first partial products as signed digit expressions in which each digit is nonnegative. The second generating means may comprise second multiplier recoder means and second partial product generating means for generating the second partial products as signed digit expressions in which each digit is nonpositive. The third generating means may comprise means for generating the partial products from the first and second partial products as signed digit expressions where each digit may have any positive, zero, or negative value.

According to one embodiment of the present invention, a multiplier to be processed is divided into parts, each part comprising, for example, two digits. The first recoder means recodes half of the parts into which the multiplier is divided, while the second recoder means recodes the remaining half of the multiplier parts in such a manner that the positive and negative signs of the multiplier parts are inverted from each other as recoded in the first and second recoder means. Upon generating each partial product, subtraction is carried out between the first partial product generated from the digits of the multiplier recoded by the first recoder means and the second partial product generated from the digits of the multiplier recoded by the second recoder means, and a sum of the partial products is obtained, specifically, a partial product of four digits of the multiplier is obtained in the form of a signed digit number each digit of which may have any negative, zero or positive value.

Processing proceeds as follows. First, an intermediate first partial product and a second partial product are generated corresponding to the first recoder means and the second recoder means, respectively, by the partial product generating means, where the multiplier recoded in the second recoder means is obtained through inversion of the positive and negative signs of the multiplier recoded in the first recoder means. Next, a partial product is generated in the form of a signed digit expression through subtraction between the intermediate first and second partial products. Since both first and second partial products are nonnegative, the subtraction between such first and second partial products does not generate a carry (or borrow), i.e., in redundant subtraction (namely subtraction in which the subtraction result is expressed by a signed digit expression with redundancy). A subtraction circuit for carrying out such subtraction may be formed by simple circuit structure. Accordingly, the number of partial products may be reduced to about half in comparison with those in the 2-bit Booth method.

In addition, an adder tree utilizing adders in the signed digit expression system may be used for addition of the partial products, and thereby processing time may be reduced.

Further in accordance with the invention, signed digit expressions in which the digits may have any negative, zero or positive value are used for arithmetic operations, and an arithmetic processor is provided comprising means for recoding a multiplier as a signed digit number, and means for generating partial products as signed digit number expressions, each digit of which may have any positive, zero or negative value, from two digits of a multiplier recoded in said recoding means and a multiplicand which is a signed digit number expression.

In one embodiment, a first means generates a first partial product as a signed digit expression each digit of which except for the most significant digit is nonnegative, and a second means generates a second partial product as a signed digit expression each digit of which except for the most significant digit is nonpositive. The first partial product generated by the first means and second partial products generated by the second means from a partial product or pair which are added together.

According to another embodiment, signed digit numbers each digit of which has a nonnegative value, i.e. zero or positive, are used for arithmetic operations, and the processor generates a partial product as a signed digit expression from two digits of a multiplier recoded as a signed digit expression and a multiplicand. An intermediate partial product corresponding to the lower of the two digits is generated by inverting the sign of each digit of the multiplicand when the lower digit is negative. An intermediate partial product corresponding to the upper of the two digits is generated by inversion of the sign of each digit of the multiplicand or a 2's complement binary number operation when the sign of the most significant digit of the higher digit is different from the sign of most significant digit of the lower digit. The partial product is generated as a signed digit number expression by adding these intermediate partial products. A supplementary term (e.g., 1) generated during generation of the intermediate partial product corresponding to the upper of the digits is considered as a part of the partial product thereof, and is added in succeeding stages, (e.g. in the higher order stages of an adder tree).

DESCRIPTION OF THE PREFERRED EMBODIMENTS

Figure 1:
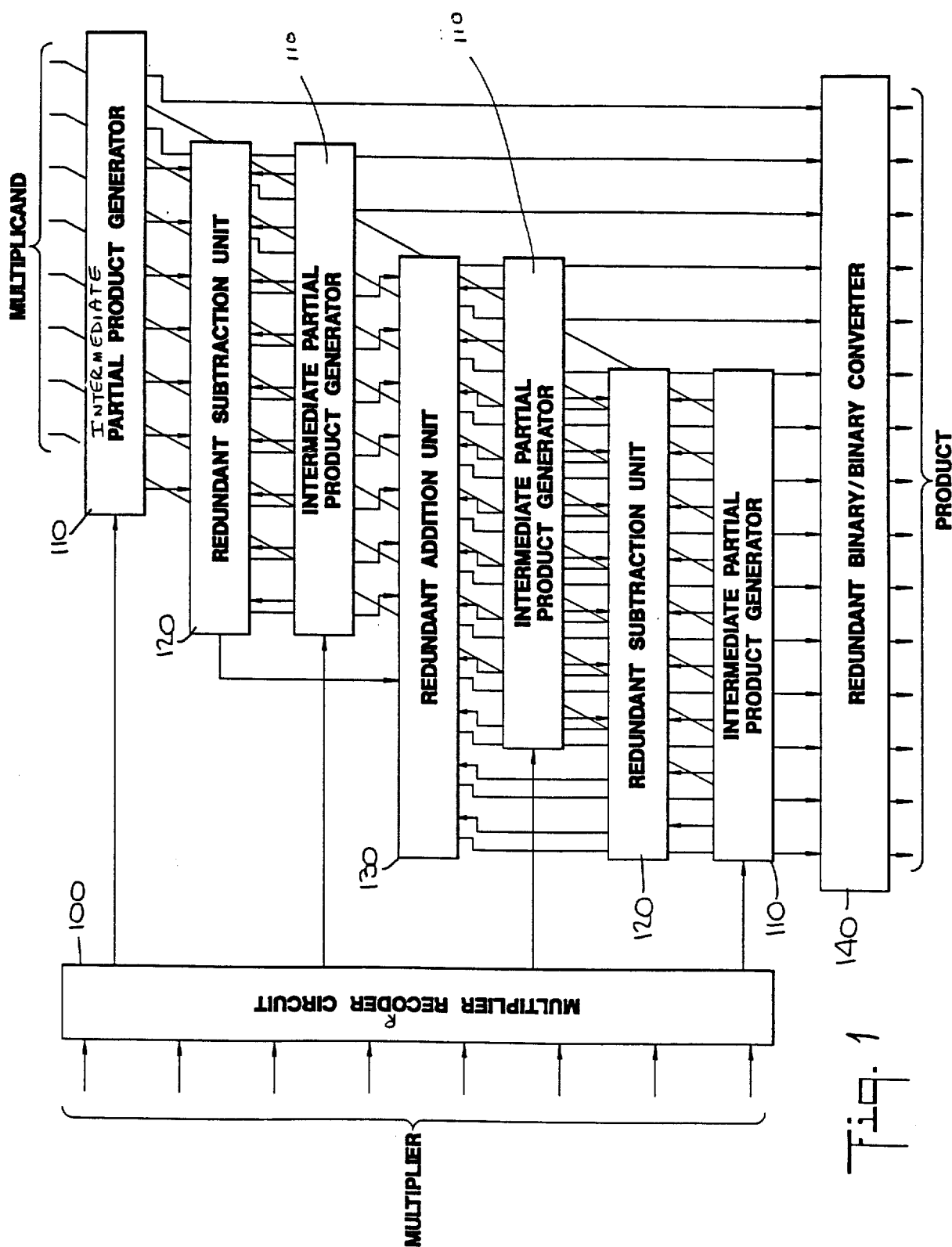
FIG. 1 is a block diagram of a multiplier according to one embodiment of the present invention.

FIG. 1 depicts an embodiment of an 8-bit×8-bit multiplier according to the present invention which includes multiplier recoder circuit 100, intermediate partial product generators 110, redundant subtraction units 120, redundant addition unit 130 and redundant binary/binary converter 140.

Multiplier recoder circuit 100 recodes digits of a multiplier in a quaternary code in which each digit may be expressed as an element of the set $\{-2, -1, 0, 1, 2\}$ according to an improved 2-bit Booth method.

Alternating even and odd intermediate partial product generators 110 receive digits of multipliers recoded by multiplier recoder circuit 100 and a multiplicand, and generate intermediate partial products.

Redundant subtraction units 120 subtract a partial product (having nonnegative digits) generated by an odd, i.e., the (2k+1)th, intermediate partial product generator 110 adjacent thereto from a partial product generated by an even, i.e., the (2k)th (including 0), intermediate partial product generator 110, and outputs the difference in the form of a redundant binary number in which each digit may be expressed as an element of the set $\{-1, 0, 1\}$.

Redundant adder 130 forms an adder tree and executes addition in the redundant binary system for ordinary redundant binary numbers.

Redundant binary/binary converter 140 converts a redundant binary number obtained as a product into a binary number, and may be implemented by carry, lookahead circuitry.

The following is a description multiplier recoder circuit 100.

A multiplier Y can be expressed in a 2's complement binary number expression by the following;

$$Y = -y_n^{2n-1} + \sum_{i=1}^{n-1} y_i^{2i-1}$$

where $y_n$ is a sign bit, and $y_{n-1}, \ldots, y_1$ are magnitude bits. For simplification, if Y is considered as an even number, then:

$$Y = \sum_{i=0}^{n/2-1} (y_{2i} + y_{2i+1} - 2 y_{2i+2})2^{2i}$$

$$= \sum_{k=0}^{n/4-1} \{ (y_{4k} + y_{4k+1} - 2 y_{4k+2})2^{4k} -$$

$$(2 y_{4k+4} - y_{4k+3} - y_{4k+2})2^{4k+2} \}$$

where $y_0=0$. The multiplication of X, Y can be expressed by the following arithmetic expression.

$$XY = \sum_{k=0}^{n/4-1} \{(y_{4k} + y_{4k+1} - 2 y_{4k+2}) \times 2^{4k} -$$

$$(2 y_{4k+4} - y_{4k+3} - y_{4k+2}) \times 2^{4k+2} \}$$

The intermediate partial product may be expressed by $$(y_{2j} + y_{2j+1} - 2 y_{2j+2}) \times 2^{2j}$$

when j is even number (including 0), or by $$(2 y_{2j+2} - y_{2j+1} - y_{2j}) \times 2^{2j}$$

when j is an odd number. The final partial product can be obtained by subtraction between the intermediate partial product expressed above when j is even number and the intermediate partial product expressed above when j is odd number. Accordingly the multiplier recoder circuit 100 recodes multipliers as quaternary signed digit numbers in which each digit $b_j$ may be expressed by any one of the elements of the set $\{-2, -1, 0, 1, 2\}$, as represented by the arithmetic expression $$b_j = (y_{2j} + y_{2j+1} - 2y_{2j+2})$$

when j is even number, or by the arithmetic expression $$b_j = (2y_{2j+2} - y_{2j+1} - y_{2j})$$

when j is odd number.

Figure 2:
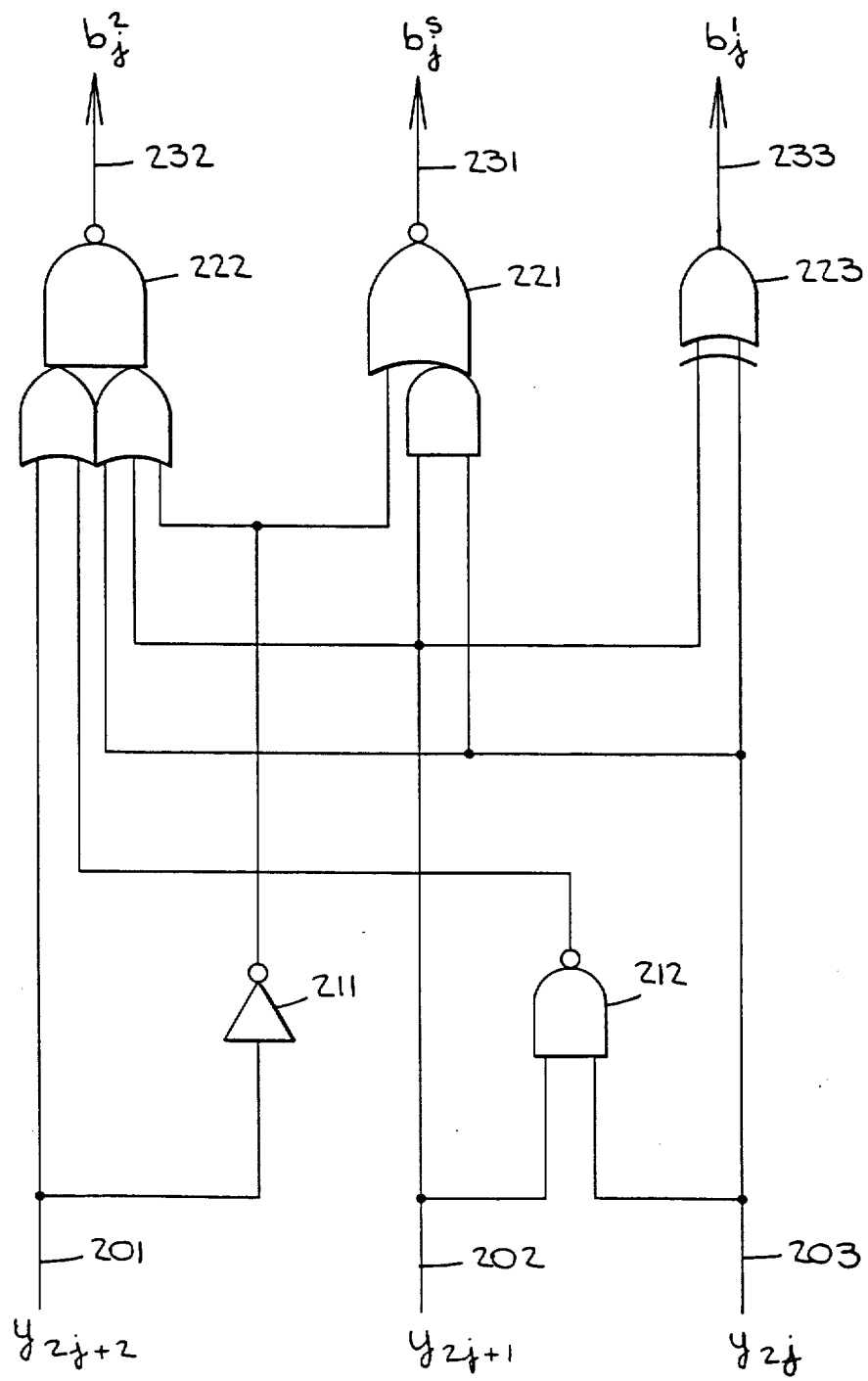
FIG. 2 is a circuit diagram of a circuit which forms the even portion of the multiplier recoder circuit of the multiplier depicted in FIG. 1.
Figure 3:
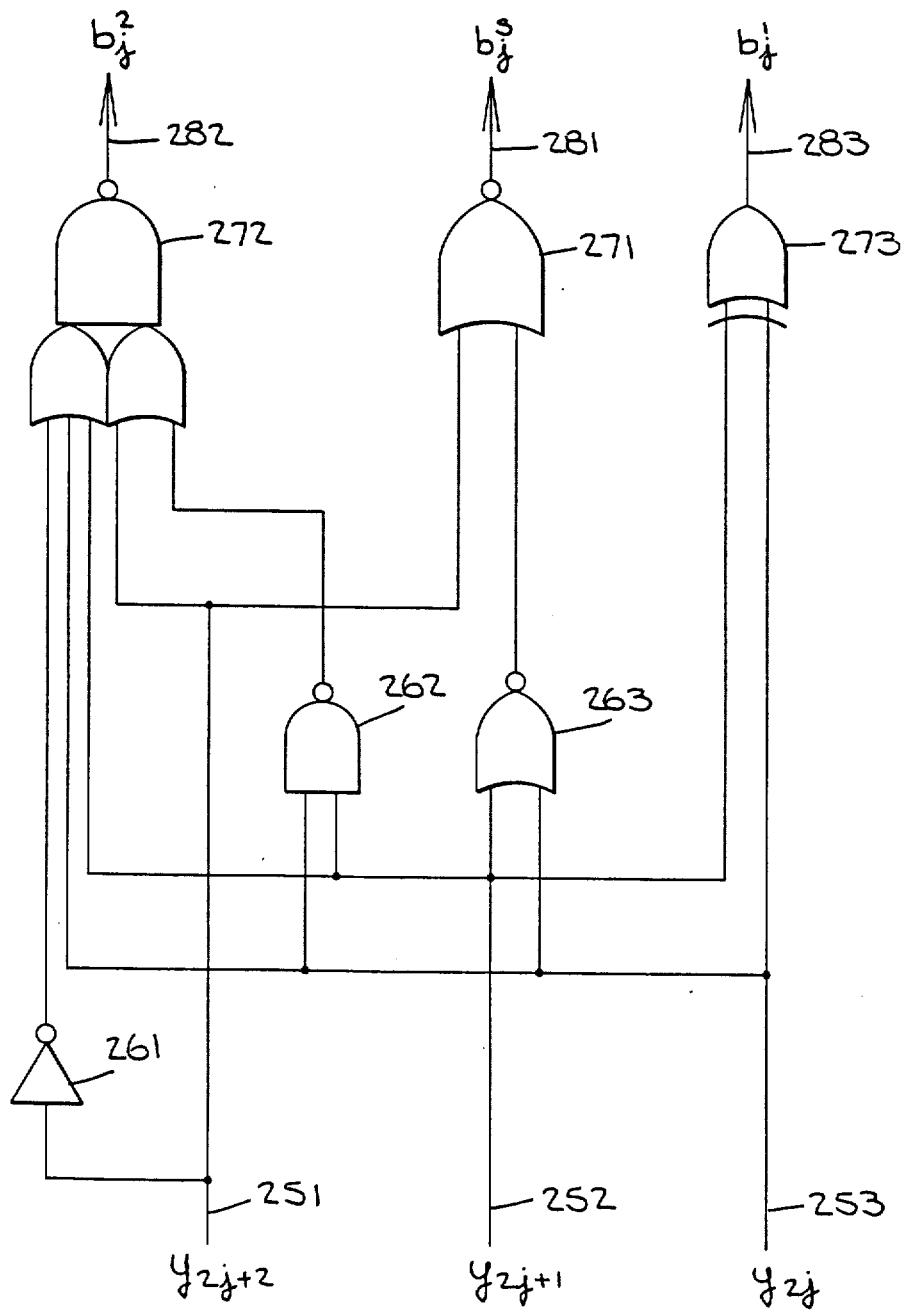
FIG. 3 is a circuit diagram of the circuit which forms the odd portion of the multiplier recoder circuit of the multiplier depicted in FIG. 1.

A description of the quaternary coding system and binary signals representing same follows, after which the circuits depicted in FIGS. 2 and 3 which form part of the multiplier recoder circuit 100 of FIG. 1 are described. The digit $b_j$ of a recoded multiplier in the quaternary code may be expressed by the 3-bit binary signal $b_j^s$, $b_j^2$, $b_j^1$ according to Table 1.

TABLE 1

| $b_j$ | $b_j^s$ | $b_j^2$ | $b_j^1$ |
|---|---|---|---|
| $-2$ | 1 | 1 | 0 |
| $-1$ | 1 | 0 | 1 |
| 0 | 0 | 0 | 0 |
| 1 | 0 | 0 | 1 |
| 2 | 0 | 1 | 0 |

As described above, when the quaternary code signal is converted to a binary signal, the j-th digit $b_j$ of the multiplier recoded in the multiplier recode circuit 100 is determined by the following expressions, where, j is an integer ranging from 0 to n/2−1.

(i) When j is even (namely, j=2k):

$$b_j^s = y_{2j+2} (\overline{y}_{2j+1} + \overline{y}_{2j}),$$

$$b_j^2 = y_{2j+2} \cdot \overline{y}_{2j+1} \cdot \overline{y}_{2j} + \overline{y}_{2j+2} \cdot y_{2j+1} \cdot y_{2j}$$

$$b_j^1 = y_{2j+1} \oplus y_{2j}$$

(ii) When j is odd (namely, j=2k+1):

$$b_j^s = \overline{y}_{2j+2} (y_{2j+1} + y_{2j}),$$

$$b_j^2 = y_{2j+2} \cdot \overline{y}_{2j+1} \cdot \overline{y}_{2j} + \overline{y}_{2j+2} \cdot y_{2j+1} \cdot y_{2j},$$

$$b_j^1 = y_{2j+1} \oplus y_{2j}$$

When j=0, the above expressions may be simplified as follows.

$b_0^s = y_2,$
$b_0^2 = y_2\overline{y}_1,$
$b_0^1 = y_1$

In the above expressions, "." represents the logical product (AND), "+" represents the logical sum (OR), "⊖" represents the exclusive logical sum (EX-OR), and "—" represents logical inverse or negation (not).

FIGS. 2 and 3 depict embodiments of circuits forming the even digit portion and odd digit portion, respectively, of the multiplier recoder circuit 100 of FIG. 1. The circuit illustrated in FIG.2 generates the even digits $b_{2k}$ of a recoded multiplier and the circuit illustrated in FIG. 3 generates the odd digits $b_{2k+1}$ of a recoded multiplier.

In the signals represented in FIG. 2, j is an even number (for example, 2k, where k is 0 or a positive integer). In the circuit of FIG. 2, gate 211 is an inverter, gate 212 is NAND gate, gate 221 is an AND-NOR composite gate, gate 222 is an OR-NAND composite gate, and gate 223 is an exclusive OR gate. Signals 201 ($y_{2j+2}$), 202 ($y_{2j+1}$), and 203 ($y_{2j}$) are 1-bit binary signals representing the (2j+2)th digit, (2j+1)th digit and (2j)th digit, respectively, of the multiplier Y, j being an even number as indicated above. Output signals 231 ($b_j^s$), 232 ($b_j^2$), 233 ($b_j^1$) form a 3-bit signal representing the (j)th digit $b_j$ of the recoded multiplier. Signal $b_j^2$ (232) is provided by the circuit formed by OR-NAND composite gate 222, inverter 211 and NAND gate 212, while signal $b_j^1$ (233) is provided by exclusive OR gate 223 and signal $b_j^s$ (231) is provided by the circuit formed by the AND-NOR composite gate 221 and inverter 211.

In the signals represented in FIG. 3, j is an odd number (for example, $2k+1$ where k is 0 or a positive integer). In FIG. 3, gate 261 is an inverter, gate 262 is an NAND gate, gate 272 is a composite OR-NAND gate and gate 273 is an exclusive OR gate, similar to inverter 211, NAND gate 212, OR-NAND composite gate 222 and exclusive OR gate 223, respectively, shown in FIG. 2. Gates 263 and 271 are NOR gates. Signals 251 ($y_{2j+2}$), 252 ($y_{2j+1}$), 253 ($y_{2j}$) are 1-bit binary signals representing the $(2j+2)$th digit, $(2j+1)$th digit and $(2j)$th digit, respectively, of the multiplier Y, j being an odd number. Output signals 281 ($b_j^s$), 282 ($b_j^2$), 283 ($b_j^1$) form a 3-bit signal representing the (j)th digit $b_j$ of the recoded multiplier. In FIG. 3, the circuit which determines the signals $b_j^2$ (282) and $b_j^1$ (283) is similar to that illustrated in FIG. 2, but signal 281 ($b_j^s$) is determined by the circuit formed by NOR gates 263 and 271.

The intermediate partial product generators 110 are described next. Intermediate partial products may have a value $-2X$, $-X$, 0, X, 2X in accordance with the value of $b_j$, where weighting by $2^j$ has been omitted and 2X means twice the multiplicand. Twice the multiplicand X can be realized by a shift of one bit and can be formed easily with combinational circuits. Inversion of positive and negative signs results in the inversion of X, i.e., the logical NOT X or $\overline{X}$ (for each digit) due to the 2's complement binary number expression and addition of 1 to the least significant digit of $\overline{X}$. However, if 1 is added in the intermediate partial product generator 110, hardware requirements increase and processing time is lengthened. Therefore, 1 is added to the least significant digit of $\overline{X}$, not in the intermediate partial product generator 110, but in adders (redundant addition units 130) for successive partial products. Thereby, an increase in hardware is prevented and high speed operation is realized. In addition, other computations are carried out earlier including supplementation (i.e., addition of 1) to the lower order digits in the intermediate partial product generator 110 to facilitate adding the supplementary term 1 in redundant addition unit 130. In practice, the least significant digit is computed in intermediate partial product generator 110 and supplementation (addition of 1) is carried out with respect to the second lowest order digit.

In that case, the (i)th digit of the intermediate partial product corresponding to the (j)th digit $b_j$ of the recorded multiplier is determined by the following expressions:

$z_{n+1} = b_j^s \oplus (b_j^2 \cdot x_n + b_j^1 \cdot \overline{x_n})$,
or
$z_{n+1} = b_j^s (b_j^2 + b_j^1) \cdot x_n + b_j^s x_n$,
For $i = 2 \sim n$,
$z_i = b_j^s \oplus (b_j^2 \cdot x_{i-1} + b_j^1 \cdot x_i)$,
$z_1 = b_j^1 x_1$,
$c_2 = b_j^s \cdot (b_j^2 + b_j^1 \overline{x_1})$
or
$c_2 = b_j^s (b_j^2 + \overline{b_j^2 x_1})$, where $c_2$ denotes a supplementary term to be added to the second digit which is added in the adder tree. The suffix j has been omitted from $z_1$, $z_i$, $c_2$.

Figure 4:
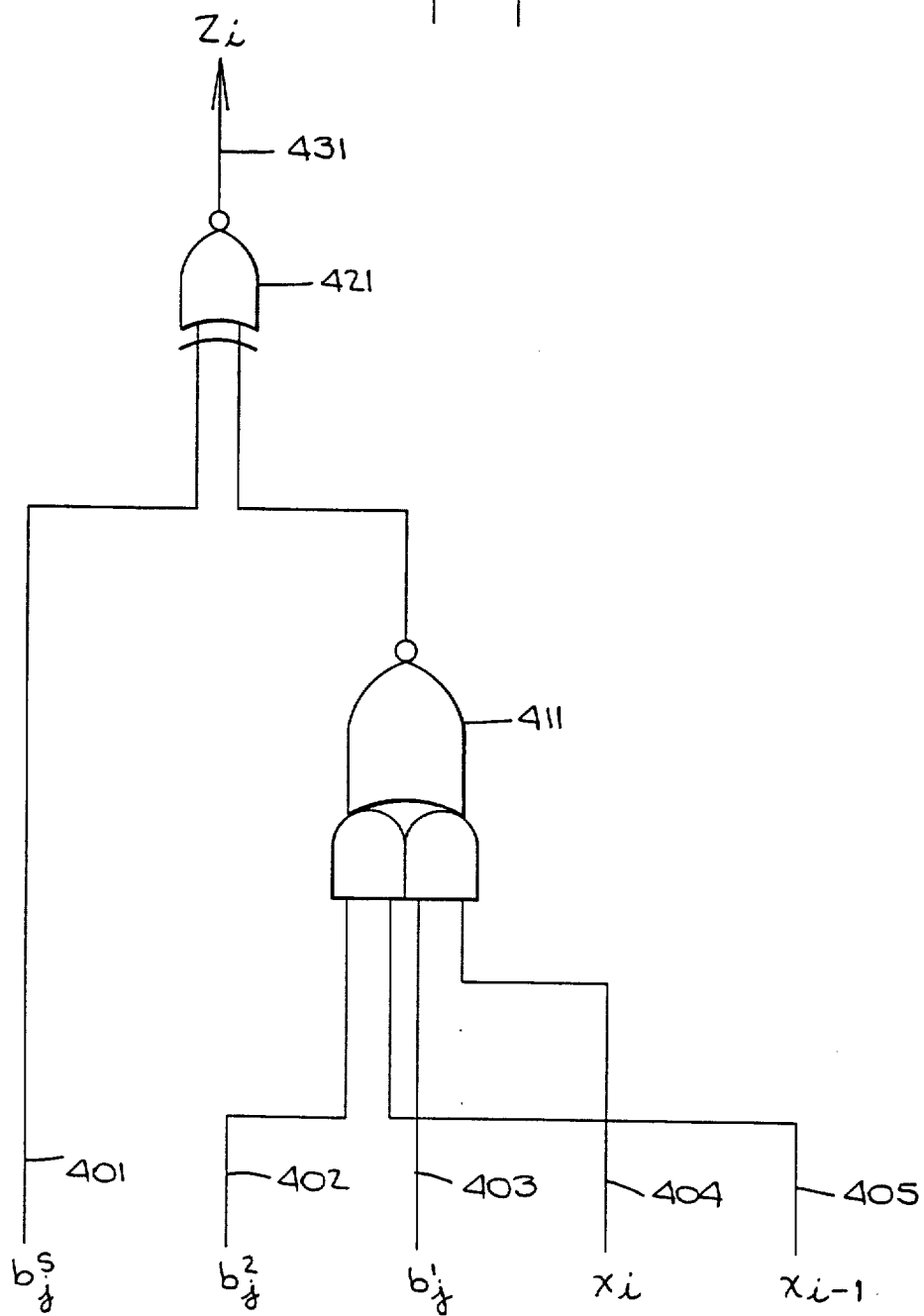
FIG. 4 is a circuit diagram of an intermediate partial product generator of the multiplier depicted in FIG. 1.

FIG. 4 depicts a circuit for determining each of the intermediate digits (i.e., the second digit to the (n)th digit) of the intermediate partial product in intermediate partial product generator 110 of FIG. 1. As depicted in FIG. 4, the circuit determines the (i)th digit $z_i$ between the second digit and the (n)th digit of the intermediate partial product corresponding to the (j)th digit $b_j$ of the recorded multiplier. In FIG. 4, gate 411 is an AND-NOR composite circuit and gate 421 is an exclusive NOR gate. Signals 401 ($b_j^s$), 402 ($b_j^2$) and 403 ($b_j^1$) form a 3-bit binary signal which represent (j)th digit of the recoded multiplier, where j is an integer between 0 and $n/2 - 1$. Output signal 431 ($z_i$) is a 1-bit binary signal representing the (i)th digit of the intermediate partial product, where i is an integer from 1 to n. Circuits for generating $z_1$, $z_{n+1}$ and $c_2$ may similarly be easily formed.

Redundant subtraction unit 120 is described next. A value obtained by subtracting the intermediate partial product corresponding to the odd digits $b_{2k+1}$ from the intermediate partial product corresponding to the even digits $b_{2k}$ of the recoded multiplier may be expressed as a redundant binary number, and carry (borrow) propagation may be eliminated during subtraction. As a result, a very simple circuit may be provided to carry out subtraction.

The digits $r_i$ of a redundant binary number are expressed by the 2-bit binary signal $r_i^s$, $r_i^a$ shown in Table 2 below, according to which the (i)th digit of the subtraction carried out in the redundant subtraction unit 120 may be determined.

TABLE 2

| $r_i$ | $r_i^s$ | $r_i^a$ |
|---|---|---|
| $-1$ | 1 | 1 |
| 0 | 0 | 0 |
| 1 | 0 | 1 |

The (i)th digits $r_i$ of the subtracted value are determined by the following expressions for the (i)th digits $z_i$ of the intermediate partial products corresponding to the even digits $b_{2k}$ and the $(i-2)$th digits $w_{i-2}$ of the intermediate partial products corresponding to the odd digits $b_{2k+1}$:

$r_{n+3}^s = \overline{w}_{n+1} \cdot z_{n+3}$, $r_{n+3}^a = w_{n+1} \oplus z_{n+3}$ or $r_{n+3}^a = \overline{w}_{n+1} \cdot z_{n+3} + (\overline{w_{n+1} + z_{n+3}})$, or by the following expressions:

$r_i^s = z_i \cdot w_{i-2}$,
$r_i^a = z_i \oplus w_{i-2}$
$r_i^a = z_i w_{i-2} + (z_i + w_{i-2})$, for $i = 3 \sim n+2$. The $(i-2)$th digits $w_{i-2}$ of the intermediate partial products for the odd digits $b_{2k+1}$ are subtracted from the (i)th digit $z_i$ of the intermediate partial products for the even digits $b_{2k}$ because the digits for even $b_j$ are offset by two digits (i.e., the weighting of $2^2$) from the digits for odd $b_j$. Moreover, $z_{n+3}$, $z_{n+2}$ are determined as $z_{n+3} = z_{n+1}$; $z_{n+2} = z_{n+1}$.

Figure 5:
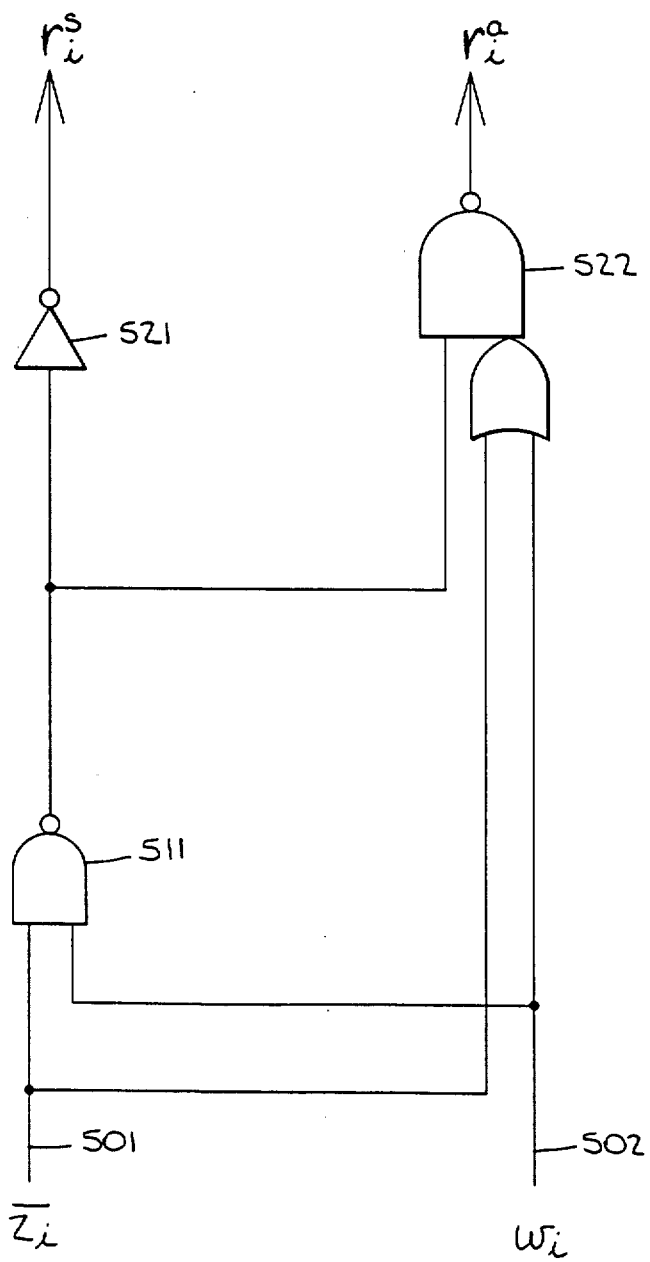
FIG. 5 is a circuit diagram of the redundant subtraction unit of the multiplier depicted in FIG. 1.

FIG. 5 depicts an embodiment of a subtraction circuit forming part of redundant subtraction unit 120 of FIG. 1 which executes subtraction between a minuend $z_i$ and subtrahend $w_i$ for each digit i. In FIG. 5, gate 511 is a NAND gate, a gate 521 is an inverter and a gate 522 is an OR-NAND composite circuit. Signal 501 ($\overline{z_i}$) is a 1-bit signal which represents the logical inverse of the (i)th digit $z_i$ of the intermediate partial product of the even number (i.e., corresponding to $b_{2k}$). Signal 502 ($w_i$)

is a 1-bit signal which represents the $(i-2)$th digit of the intermediate partial products of the odd number (i.e., corresponding to $b_{2k+1}$). Since a subtrahend $w_i$ is always 0 for $i=1, 2$, a minuend $z_i$ may be used as the subtraction result. Moreover, when $i=n+3$, the subtraction circuit of FIG. 5 may also be operated by interchanging the minuend $z_i$ and subtrahend $w_i$ of the input signal. Output signals 531 ($r_i^s$) and 532 ($r_i^a$) form a 2-bit binary signal which represents the (i)th digit $r_i$ of the subtraction value namely the partial product (i.e., a redundant binary number) for each 4-bits of a multiplier. Alternatively, the subtraction circuit may be formed by a 2-input NOR gate and an exclusive NOR gate in place of the circuit of FIG. 5. Here, the logical inverse signal $\bar{z}_i$ (501) of the digits $z_i$ of the intermediate partial products of FIG. 5 may be obtained easily without increasing the number of transistor gates by replacing the exclusive NOR gate 421 of FIG. 4 with an exclusive OR gate.

Addition of the supplementary term in even numbered partial products (i.e., corresponding to $b_{2k}$) facilitates addition in an adder tree when computed at the same time as the redundant subtraction. Addition of the second digit $z_2$ of even numbered intermediate partial products and the supplementary term $c_2$ is determined by the following expressions: for the second digit of the intermediate partial products $r_2^s=0$, $r_2^a=x_2 \oplus c_2$, and for the supplementary term $t_3$ to the third digit (i.e., carry)

$t_3^s=0$, $t_3^a=x_2-c_2$.

The supplementary term $t_3$ and the supplementary term $c_2$ to the second digit of each odd-numbered intermediate partial product are easily added to partial product, respectively, in an adder tree. However, since odd-numbered intermediate partial products are subtracted from even-numbered partial products, the supplementary term thereof becomes $-c_2$ instead of $c_2$.

A redundant adder 130 which forms the adder tree will be described next.

Addition in which carry propagation in the redundant adder 130 is 1 digit at most is carried out in accordance with Table 3.

The signal $P_i$, which indicates combination of the (i)th digit $x_i$ of the augend and the (i)th digit $y_i$ of the addend, is introduced in the form $P_i = \overline{x_i^s + y_i^s}$ The variables $u_i$, $v_i$, are introduced by the following arithmetic expressions, $u_i = P_{i-1} + s_i$, $v_i = P_i - c_i$ The variables $u_i$, $v_i$ are related to the intermediate carry $c_i$ and the intermediate sum digit $s_i$ respectively in Table 3. The variables $u_i$, $v_i$ and an absolute value $s_i^a$ of intermediate sum digit $s_i$, are determined by the following expressions:

$s_i^a = x_i^a \oplus y_i^a$
$u_i = s_i^a \oplus P_{i-1}$
$v_i = \overline{(s_i^a + P_{i-1})} \, (x_i^s y_i^s + \overline{x_i^a} \, \overline{y_i^a})$.

The final sum $z_i$ represented by a 2-bit signal $z_i^s$, $z_i^a$ is determined by the following expressions:

$z_i^s = u_i \cdot v_{i-1}$ $z_i^a = u_i \oplus v_{i-1}$.

Figure 6:
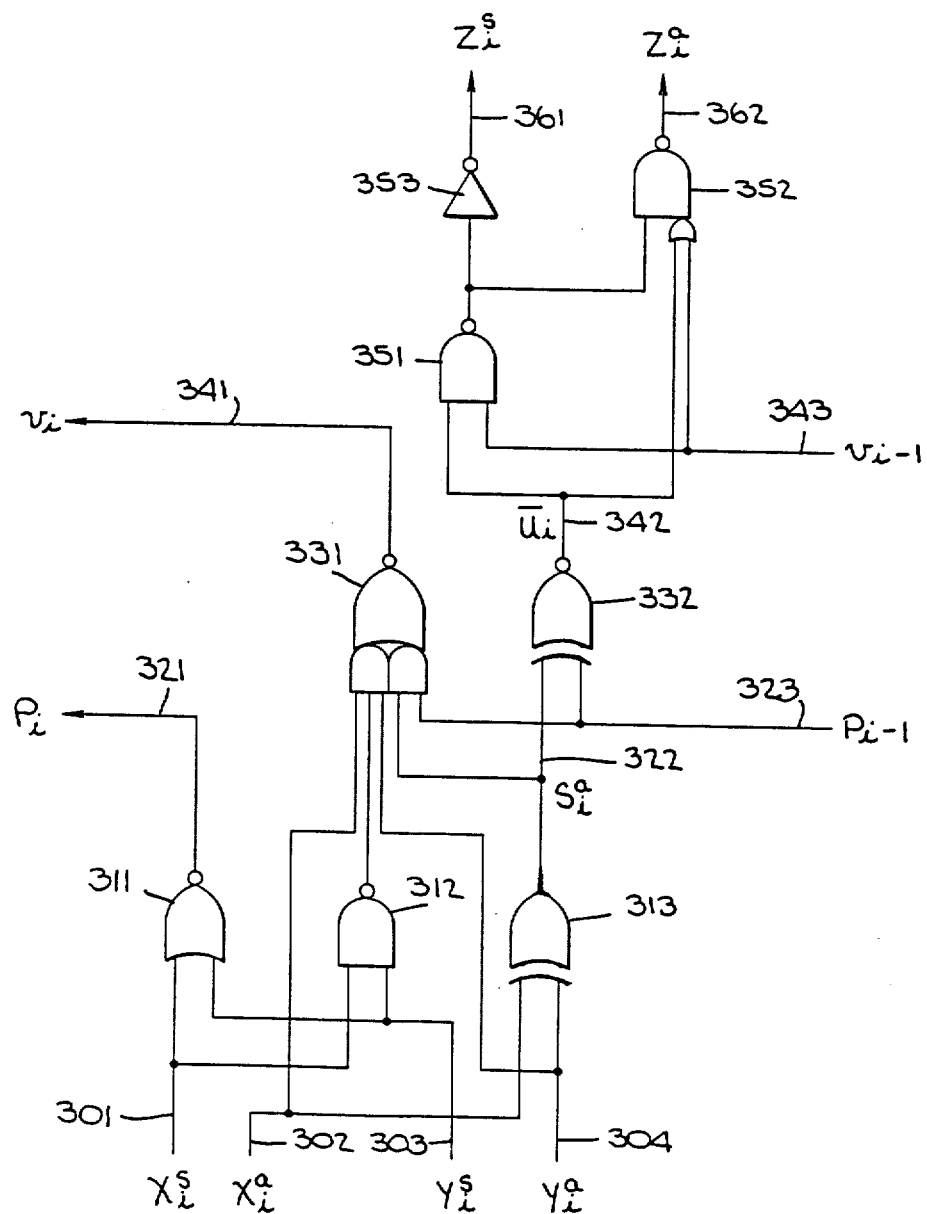
FIG. 6 is a circuit diagram of an addition cell of the redundant addition unit of the multiplier depicted in FIG. 1.

FIG. 6 is a circuit diagram of an embodiment of an addition circuit forming redundant addition unit 130 of FIG. 1. In FIG. 6, gate 311 is a NOR gate, gates 312 and 351 are NAND gates, gate 313 is an exclusive OR gate, gate 332 is an exclusive NOR gate, gate 353 is an inverter, gate 331 is AND-NOR composite circuit, gate 352 is an OR-NAND composite circuit.

Signals 301 ($x_i^s$) and 302 ($x_i^a$) FIG. 6 form a 2-bit signal which indicates the (i)th digit $x_i$ of the redundant binary number as the augend. Signals 303 ($y_i^s$) and 304 ($y_1^a$) form a 2-bit signal which indicates the (i)th digit $y_i$ of the redundant binary number as the addend. Output signal 321 ($P_i$) is a 1-bit signal which indicates the state of said augend and addend at the (i)th digit. Signal 322 ($S_i^a$) is a 1-bit signal which indicates the absolute value of the intermediate sum digit of the (i)th digit. Output signal 341 ($v_i$) is a 1-bit signal which indicates the intermediate carry at the (i)th digit. Signal 343 ($v_{i-1}$) is a 1-bit signal which indicates the intermediate carry at the $(i-1)$th digit. Signal 342 ($\bar{u}_i$) is the logical inverse of the signal $u_i$ which indicates the intermediate sum digit at the (i)th digit. Output signals 361 ($z_i^s$) and 362 ($z_i^a$) form a 2-bit signal which indicates the (i)th digit of the final sum.

In the embodiment of FIG. 1, a partial product is generated by subtracting the odd numbered intermediate partial products from the even numbered intermediate partial products. However, a partial product may be generated by subtracting the even numbered intermedi-

TABLE 3

| Type | Augend ($x_i$) | Addend ($y_i$) | Next lower digit ($x_{i-1}$, $y_{i-1}$) | Carry ($c_i$) | Intermediate sum ($s_i$) |
|---|---|---|---|---|---|
| <1> | 1 | 1 | — | 1 | 0 |
| <2> | 1 | 0 | Both are not negative. | 1 | −1 |
|  | 0 | 1 | At least one is negative. | 0 | 1 |
| <3> | 0 | 0 | — | 0 | 0 |
| <4> | 1 | −1 | — | 0 | 0 |
|  | −1 | 1 | — | 0 | 0 |
| <5> | 0 | −1 | Both are not negative | 0 | −1 |
|  | −1 | 0 | At least one is negative | −1 | 1 |
| <6> | −1 | −1 | — | −1 | 0 | ate partial products from the odd numbered intermediate partial products.

For example, the arithmetic expressions given above for the product of the multipliers XY may be transformed as indicated below.

$$X \cdot Y = \sum_{k=0}^{n/4-1} \{S_k \cdot (E_k \cdot X) - S_k (F_k \cdot X \cdot 2^2)\} 2^{4k},$$

where
$S_k = \text{sign}(y_{4k} + y_{4k+1} - 2y_{4k+2})$
$E_k = |y_{4k} + y_{4k+1} - 2y_{4k+2}|$
$F_k = S_k \cdot (2y_{4k+4} - y_{4k+3} - y_{4k+2})$.

Sign (X) is a function which becomes 1 when X is positive or zero, and $-1$ when X is negative, and $|X|$ is the absolute value of X.

In the above arithmetic expressions, $$\{S_k \cdot (E_k \cdot X) - S_k(F_k \cdot X \cdot 2^2)\} \cdot 2^{4k},$$

represents a subtraction between two terms; when $S_k = 1$, the second term (the odd numbered intermediate partial products) is subtracted from the first term (the even numbered intermediate partial products), and when $S_k = -1$, the reverse is true, i.e., the first term is subtracted from the second term. In that case, since $E_k$ may have any value from the elements in the set $\{0, 1, 2\}$, $E_k X$ is always nonnegative. However, since $F_k$ may have any value from the elements in the set $\{-2, -1, 0, 1, 2\}$, $F_k X 2^2$ may sometimes be negative. On the other hand, utilizing the 2's complement binary number expression, each digit of $F_k X 2^2$ is nonnegative.

Since the even numbered intermediate partial products can not be expressed as a 2's complement binary number, the 2's complement binary number and supplementation by adding $+1$, as described above, may be used only in the generation of the odd numbered intermediate partial products where the addition of the supplementary term can be realized easily. Moreover, subtraction of these two terms can also be interpreted as the addition of a redundant binary number having only nonnegative digits and a redundant binary number having only nonpositive digits.

Figure 7:
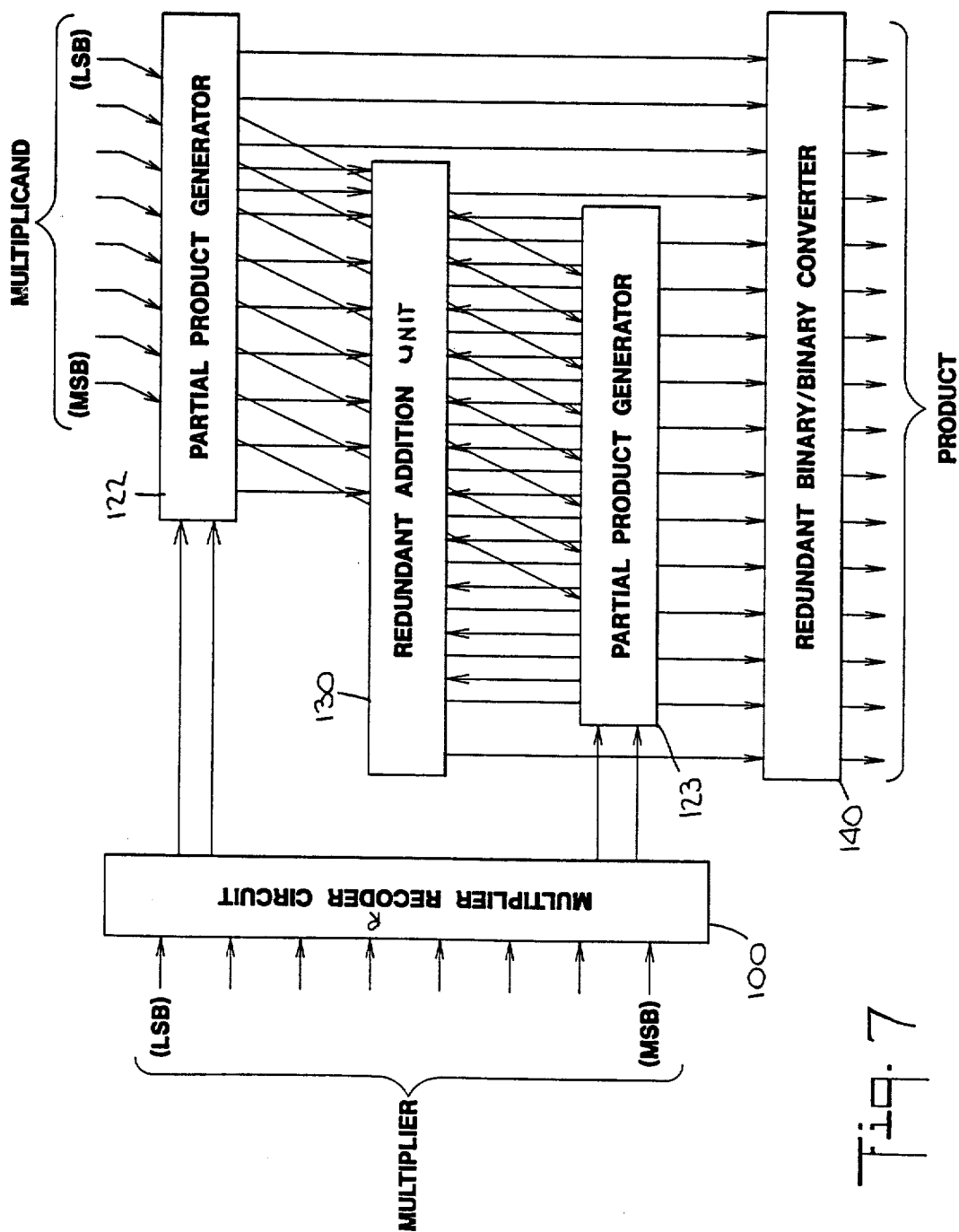
FIG. 7 is a block diagram of a multiplier according to another embodiment of the invention.

FIG. 7 illustrates another embodiment of a multiplier according to the present invention. The multiplier of FIG. 7 has basically the same structure as the multiplier of FIG. 1, and combines two intermediate partial product generators 110 and the related redundant subtraction unit 120 of FIG. 1 into respective partial product generators 122 and 123. The multiplier of FIG. 7 generates the partial product of a redundant binary number from two consecutive digits of the recoded multiplier. The multiplier recoder circuit 100, the redundant addition unit 130 and redundant binary/binary converter 140 illustrated in FIG. 7 are respectively equivalent to the multiplier recoder circuit 100, redundant addition unit 130 and redundant binary/binary converter 140 illustrated in FIG. 1.

Multiplier recoder circuit 100 in FIG. 7 recodes each digit in the same manner and does not discriminate between even and odd digits of the recoded multiplier, unlike the multiplier of FIG. 1. For example, both the even digit portion and odd digit portion of multiplier recoded circuit 100 in FIG. 7 may be formed by the circuit illustrated in FIG. 2.

According to the embodiment of FIG. 7, the digits $b_j$ of the recoded multiplier may be expressed by the 3-bit binary signal composed of bits $b_j^s$, $b_j^2$, $b_j^1$, as indicated in Table 4.

TABLE 4

| $y_{2i+2}$ | $y_{2i+1}$ | $y_{2i}$ | $b_j$ | $b_j^s$ | $b_j^1$ | $b_j^2$ |
|---|---|---|---|---|---|---|
| 0 | 0 | 0 | 0 | 0 | 0 | 0 |
| 0 | 0 | 1 | 1 | 0 | 1 | 0 |
| 0 | 1 | 0 | 1 | 0 | 1 | 0 |
| 0 | 1 | 1 | 2 | 0 | 0 | 1 |
| 1 | 0 | 0 | $-2$ | 1 | 0 | 1 |
| 1 | 0 | 1 | $-1$ | 1 | 1 | 0 |
| 1 | 1 | 0 | $-1$ | 1 | 1 | 0 |
| 1 | 1 | 1 | 0 | 1 | 0 | 0 |

The (i)th digit $R_i$ of the recoded multiplier may be expressed by the following expressions using the binary encoding of Table 4.

Figure 8:
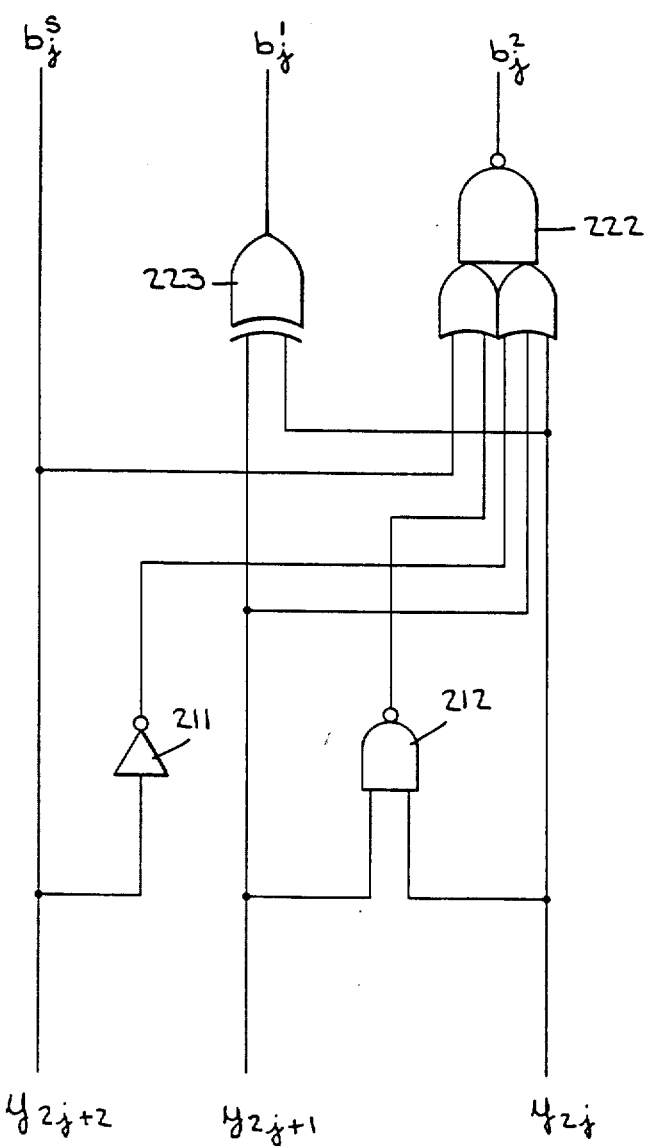
FIG. 8 is a circuit diagram of a multiplier recoder circuit of the multiplier of FIG. 7.

$b_j^s = y_{2i+2}$
$b_j^1 = y_{2i+1} \oplus y_{2i}$
$b_j^2 = \overline{y_{2i+2}} \cdot y_{2i+1} \cdot y_{2i} + y_{2i+2} \cdot \overline{y_{2i+1}} \cdot \overline{y_{2i}}$ FIG. 8 is an embodiment of a circuit which forms part of the multiplier recoder circuit 100 of FIG. 7. In FIG. 8, signals $y_{2i+2}$, $y_{2i+1}$ and $y_{2i}$ are input signals respectively representing the $2i+2$, $2i+1$ and $2i$ digits of the multiplier Y, and output signals $b_j^s$, $b_j^1$ and $b_j^2$, representing digits of the recoded multiplier, are generated from those signals by inverter 211, NAND gate 212, EX-OR gate 223 and OR-NAND composite circuit 222 in a manner similar to that described in connection with FIG. 2.

Partial product generators 122 and 123 of FIG. 7 will be described next. Partial product generators 122 and 123 generate partial products of redundant binary numbers from the multiplicand and two digits of the recoded multiplier expressed as a quaternary SD number. In this case, the adjacent two digits of the recoded multiplier may be expressed as a lower digit represented by $R_L$ and an upper digit represented by $R_H$. By adding an intermediate partial product obtained from the lower digit $R_L$ and a multiplicand and an intermediate partial product obtained from the upper digit $R_H$ and a multiplicand, a partial product is generated.

For a multiplicand X, the partial product may have any value from the elements in the set $-2X$, $31 X$, $0$, $X$, $2X$ of recoded values $R_L$, $R_H$. In this case, the $2^i$ weighting factor is omitted. $2X$, which is twice the multiplicand X, can be realized by shifting the multiplicand one digit to the left. Inversion of positive and negative signs may be realized by inverting the positive and negative signs of each digit of multiplicand or by a 2's complement binary number. Such sign inversion of each digit of the multiplicand may be realized for the intermediate partial product of the lower digit $R_L$ of the recoded multiplier and the multiplicand. Further, the sign of the most significant digit of the intermediate partial product of the higher digit $R_H$ of the recoded multiplier, is equalized with inversion of the sign of the most significant digit of the intermediate partial product for the lower digit $R_L$ of the recoded multiplier by sign inversion of each digit and 2's complement.

As described previously, when the intermediate partial product is generated, supplementation by $+1$ or $+1$ ($\sim$ indicates sign inversion) is required for the 2's complement binary number expression for generating the intermediate partial product for the upper digit $R_H$ of the recoded multiplier, and addition of the supplementary term may be carried out during addition of the redundant binary numbers in the generation of the partial product. In that case, computation of the least significant digit is carried out during generation of the partial product in order to facilitate addition of the supplementary term, which is carried out to the second less significant digit. Thereby, since the least significant digit of the partial product is shifted by four digits from the least significant digit of the partial product generated from the next two higher order digits of the recoded multiplier, the supplementary term may be added to the next digit lower than the least significant digit of the partial product generated from next digits higher than the digit of the recoded multiplier, and it can be handled as one digit of the upper partial products. Generation of the intermediate partial product for the digits $R_L$, $R_H$ of the recoded multiplier including the supplementary term is indicated in the Table 5.

-continued $$a^a_{n\oplus 1} = \overline{r_L^s \oplus x_n \oplus r_H^s + (r_H^1 \cdot x_{n-1} + r_H^2 \cdot x_{n-2})}$$

For $i = 4, \ldots, n$, $$a_i^s = \overline{r_L^s \oplus (r_L^1 \cdot x_i + r_L^2 \cdot x_{i-1}) \cdot r_H^s \oplus (r_H^1 \cdot x_{i-2} + r_H^2 \cdot x_{i-3})}$$

$$a_i^a = \overline{r_L^s \oplus (r_L^1 x_i + r_L^2 x_{i-1}) \oplus r_H^s \oplus (r_H^1 x_{i-2} + r_H^2 x_{i-3})}$$

$$a_3^s = \overline{r_L^s \oplus (r_L^1 \cdot x_3 + r_L^2 \cdot x_2) \cdot \overline{r_L^s \oplus (r_H^1 \cdot x_1)}}$$

$$a_3^a = \overline{r_L^s \oplus (r_L^1 \cdot x_3 + r_L^2 \cdot x_2) \oplus \overline{r_L^s \oplus (r_H^1 \cdot x_1)}}$$

$$a_2^s = \overline{r_L^s \cdot (r_L^1 \cdot x_2 + r_L^2 \cdot x_1)}$$

$$a_2^a = r_L^1 \cdot x_2 + r_L^2 \cdot x_1$$

$$a_1^s = \overline{r_L^s \cdot r_L^1 \cdot x_1}$$

$$a_1^a = \overline{r_L^s \cdot r_L^1 \cdot x_1}$$

In the above expressions, $r_L^s$, $r_L^1$, $r_L^2$ are binary signals representing $R_L$, while $r_H^s$, $r_H^1$, $r_H^2$ are binary signals representing $R_H$.

TABLE 5

| Digits $R_L \cdot R_H$ of recoded multiplier | Intermediate partial product for RL, and the intermediate partial product for $R_H$ in the case of different signs for $R_L$ and $R_H$ | Intermediate partial product for $R_H$ including the supplementary term in the case of same signs for $R_L$ and $R_H$ |
|---|---|---|
| −2 | $[x_{n-1}, \widetilde{x}_{n-2}, \widetilde{x}_{n-3}, \ldots \widetilde{x}_0, \widetilde{\ }]$ | $\left[\widetilde{\widetilde{x}}_{n-1}, \bar{x}_{n-2}, \bar{x}_{n-3}, \ldots, \dfrac{\bar{x}_0}{1}, 0\right]$ |
| −1 | $[x_{n-1}, \widetilde{x}_{n-1}, \widetilde{x}_{n-2}, \ldots \widetilde{x}_1, \widetilde{x}_0]$ | $\left[\widetilde{\widetilde{x}}_{n-1}, \bar{x}_{n-1}, \bar{x}_{n-2}, \ldots, \dfrac{\bar{x}_1}{x_0}, x_0\right]$ |
| −0 | $[0, \widetilde{0}, \widetilde{0}, \ldots \widetilde{0}, \widetilde{0}]$ | $\left[\bar{0}, \bar{0}, \bar{0}, \ldots, \dfrac{\bar{0}}{1}, 0\right]$ |
| 0 | $[\widetilde{0}, 0, 0, \ldots 0, 0]$ | $\left[\bar{0}, \widetilde{\bar{0}}, \widetilde{\bar{0}}, \ldots, \dfrac{\widetilde{\bar{0}}}{1}, \widetilde{0}\right]$ |
| 1 | $[\widetilde{x}_{n-1}, x_{n-1}, x_{n-2}, \ldots x_1, x_0]$ | $\left[\bar{x}_{n-1}, \widetilde{\bar{x}}_{n-1}, \widetilde{\bar{x}}_{n-2}, \ldots, \dfrac{\widetilde{\bar{x}}_1}{\widetilde{x}_0}, \widetilde{x}_0\right]$ |
| 2 | $[\widetilde{x}_{n-1}, x_{n-2}, x_{n-3}, \ldots x_0, 0]$ | $\left[\bar{x}_{n-1}, \widetilde{\bar{x}}_{n-2}, \widetilde{\bar{x}}_{n-3}, \ldots, \dfrac{\widetilde{\bar{x}}_0}{1}, \widetilde{0}\right]$ |

Addition of intermediate partial products is facilitated by generating the intermediate partial products as described above. Since the signs of each digit of the partial product generated by $R_L$ and the partial product generated by $R_H$ are inverted, a carry is not generated, which enables the partial product of the redundant binary number to be generated by a simple circuit. For example, if one digit $a_i$ of redundant binary number is encoded in accordance with Table 5 above, into a binary code by the two binary signals $a_i^s$, $a_i^a$, each digit of the partial product may be generated by adding the intermediate partial product for $R_L$ and the intermediate partial product for $R_H$ shifted by two digits to the left, and may be expressed by the following logical expressions.

$$a_{n+3}^s = \overline{r_L^s \cdot r_H^s} \cdot x_n + r_L^s \cdot r_H^s \cdot \overline{x_n}$$

$$a_{n+3}^a = \overline{r_L^s \oplus r_H^s}$$

$$a_{n+2}^s = \overline{r_L^s \oplus x_n \cdot r_H^s \oplus (r_H^1 \cdot x_n + r_H^2 \cdot x_{n-1})}$$

$$a_{n+2}^a = \overline{r_L^s \oplus x_n \oplus \cdot r_H^s \oplus (r_H^1 \cdot x_n + r_H^2 \cdot x_{n-1})}$$

$$a_{n+1}^s = \overline{r_L^s \oplus x_n \cdot r_H^s \oplus (r_H^1 \cdot x_{n-1} + r_H^2 \cdot x_{n-2})}$$

In addition, the supplementary term may be expressed by $C^s$ and $c^a$ as indicated below.

$$C^s = \overline{r_L^s \cdot r_H^s \cdot r_H^1 \cdot x_1}$$

$$C^a = \overline{r_L^s \oplus r_H^s \cdot r_H^1 x_1}.$$

Figure 9:
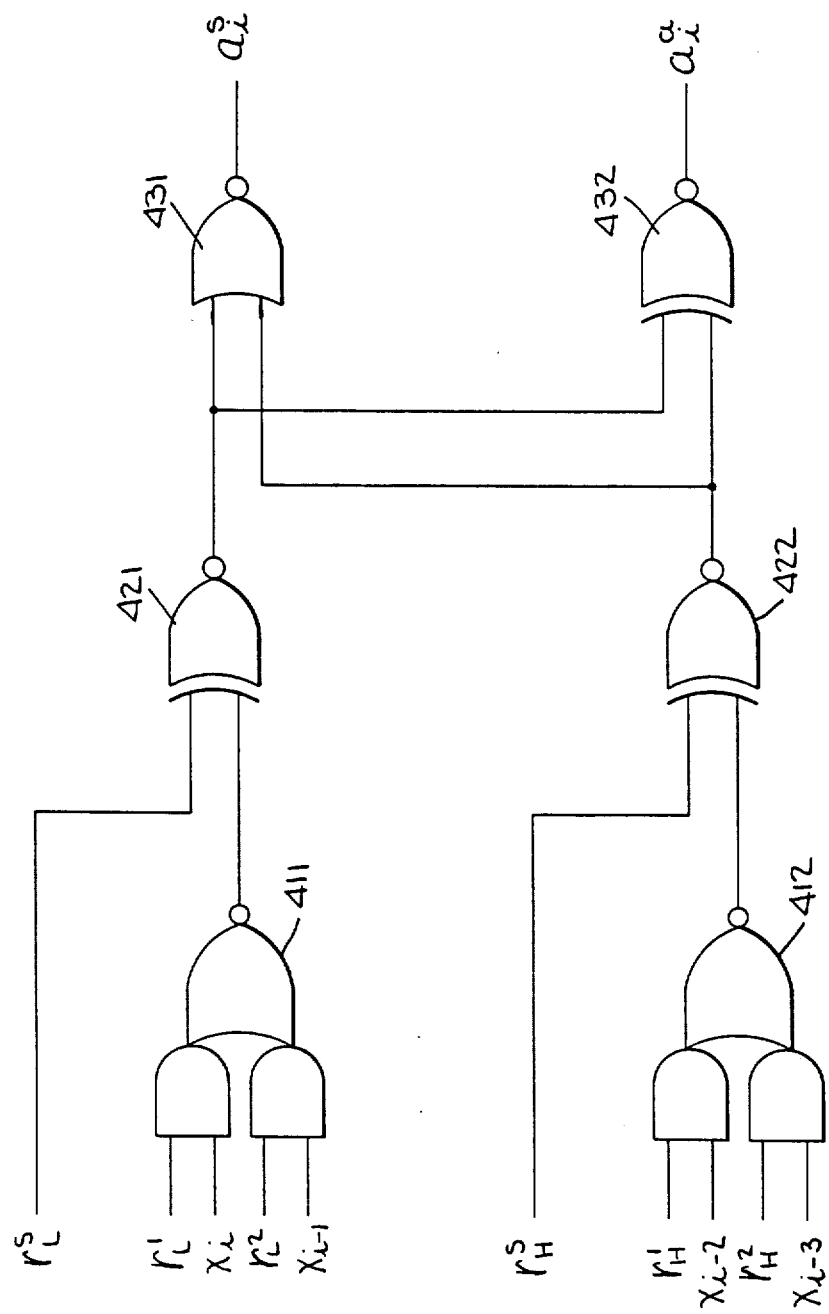
FIG. 9 is a circuit diagram of the partial product generating circuit of the multiplier of FIG. 7.

FIG. 9 is an embodiment of a circuit forming part of the partial product generators 122 and 123 of FIG. 7 which generates the partial products from the n-th digit to fourth digit. The circuit of FIG. 9 combines the circuits of FIGS. 4 and 5. In FIG. 9, gates 411 and 412 are AND-NOR composite gates similar to gate 411 in FIG. 4, gates 421, and 422 are EX-NOR gates similar to gate 421 in FIG. 4, gate 432 is also an EX-NOR gate, and gate 431 is a NOR gate. The circuit of FIG. 9, outputs a signal corresponding to the intermediate partial product from EX-NOR gate 421 for the lower order digits of a recoded multiplier and from EX-NOR gate 422 for the higher order digits. These two signals are added in FIG. 9 and the partial product is output from the NOR gate 431 and EX-NOR gate 432 as signals $a_i^s$ and $a_i^a$ (which are equivalent to the output of the circuit of FIG. 6) in the form of a redundant binary number expression.

The redundant addition unit 130 of FIG. 7, which forms the adder tree, is implemented for each digit, similar to the multiplier of FIG. 1, by the adder circuit illustrated in FIG. 6.

Figure 10:
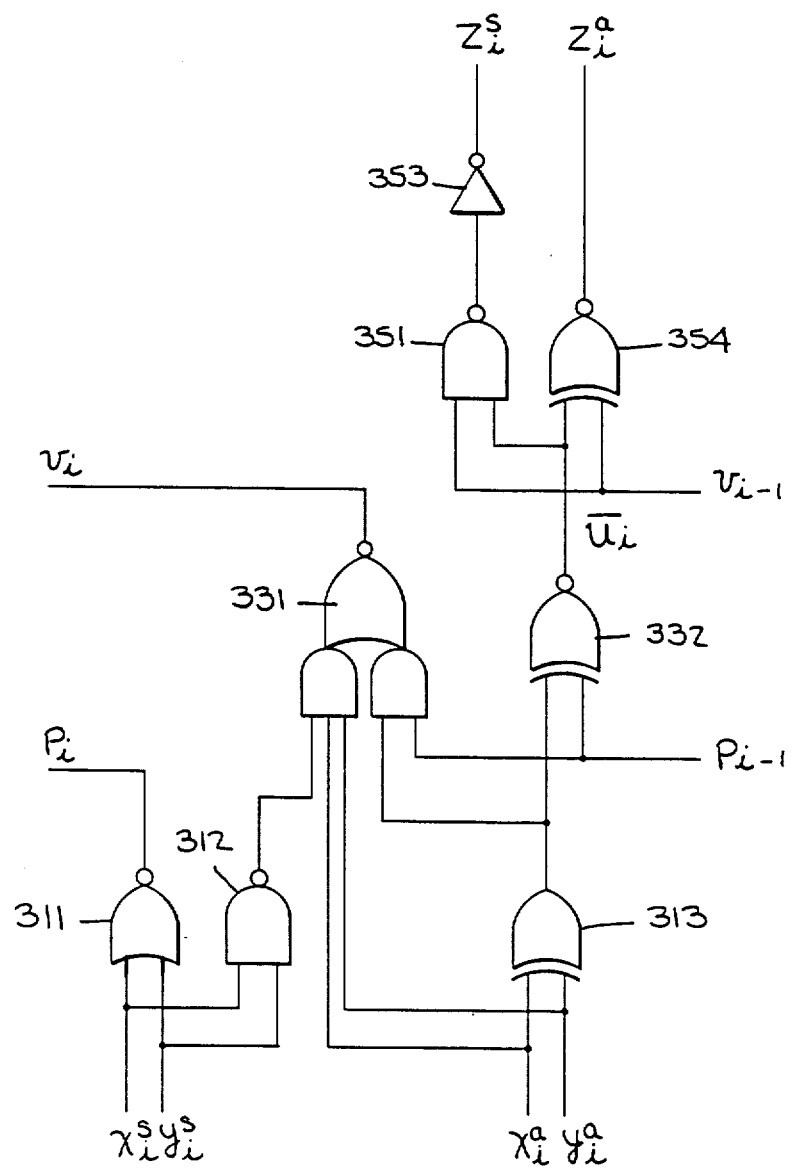
FIG. 10 is a circuit diagram of an addition cell of the redundant addition circuit of the multiplier depicted in FIG. 7.

FIG. 10 is an adder circuit for one digit which is equivalent to the adder circuit of FIG. 6. Each gate in the circuit of FIG. 10 corresponds to the like-numbered gate in the circuit of FIG. 6, except for gate 354 in FIG. 10 which is logically equivalent to and replaces the circuit consisting of OR-NAND composite circuit 352 (and connection thereto of NAND gate 351).

The redundant addition unit 130 of FIG. 7 may be implemented by connecting as many redundant adders of FIG. 10 as are required for the number of digits to be added.

In the case of the 8×8-bit multipliers of FIGS. 1 and 7, two partial products are generated and therefore only one redundant addition unit is necessary, but the number of partial products generated increases with the number of digits of the multiplier. In such a case, a plurality of redundant addition units are required so that the partial products are added in tree fashion in units of two partial products.

It should be apparent that certain gates may be replaced by other gates, inverters and/or use of inverted signals. For example, EX-NOR gate 223 in FIG. 2 may be replaced by an EX-OR gate, and NOR gate 311 in FIG. 10 may be to replaced by a NAND gate (and vice versa) and logical inversion of signals or combinations with the inverters. Similarly composite gates or exclusive OR gates, etc. may be replaced by the NAND gates, NOR gates and combinations thereof with inverters, and vice versa.

The circuit embodiments described above may be implemented by binary logic using CMOS circuits, but they may also be implemented by utilizing other technology (for example, NMOS, ECL, TTL, IIL, etc.) or higher-radix logic.

An embodiment of a multiplier according to the present invention implemented by ECL circuits is described next.

Figure 11:
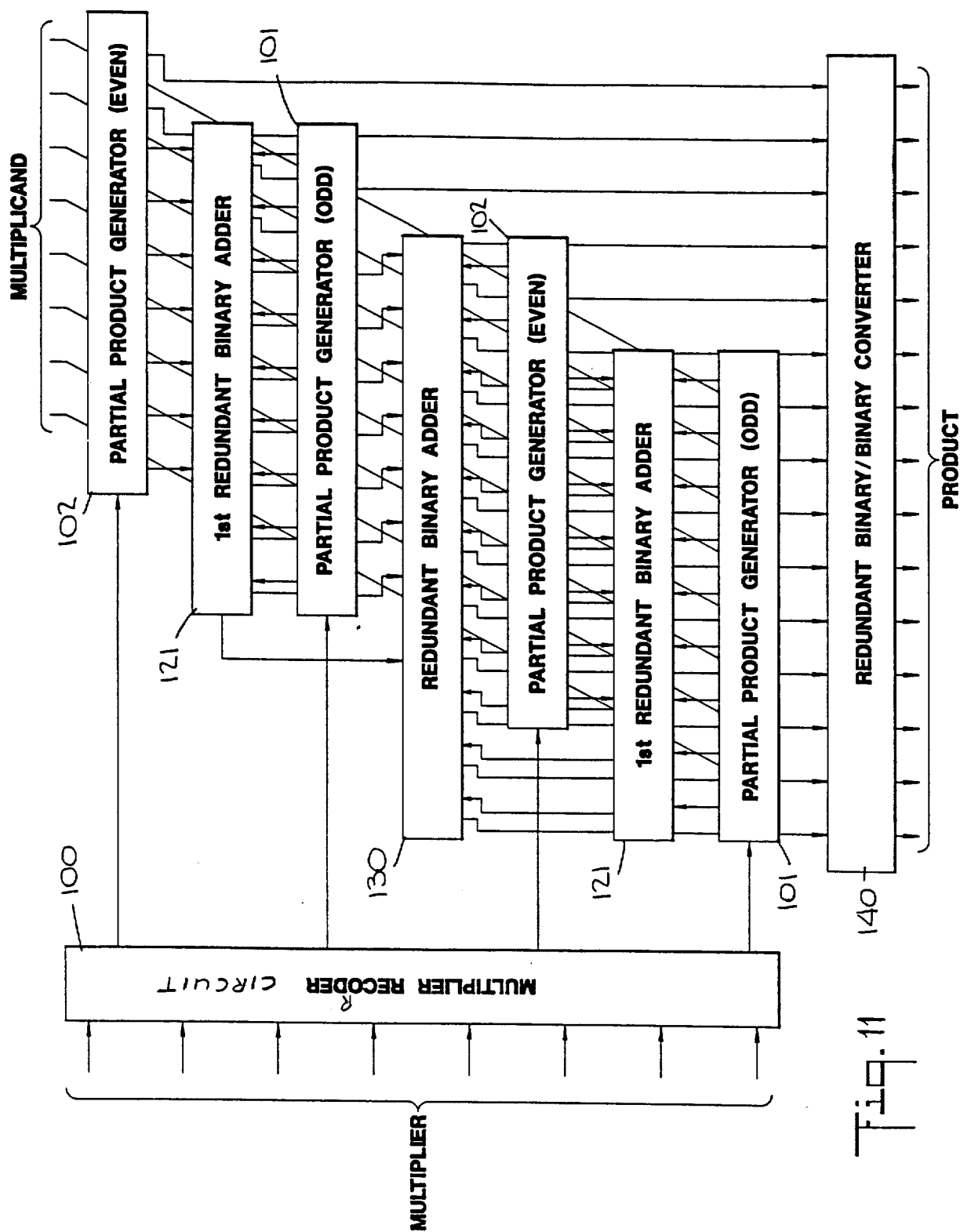
FIG. 11 is a block diagram of still another embodiment of a multiplier according to the present invention.

In the generation of partial products as described above, the augend is nonnegative and the addend is nonpositive for almost all digits in addition in the first stage of the adder tree, and carry can be eliminated in such addition by generating the intermediate partial products as a signed digit expression where all digits, except for the most significant digit, are either all nonnegative, or all nonpositive, and then adding these partial products in the first stage of the adder tree. FIG. 11 is a block diagram of such a multiplier.

Referring to FIG. 11, multiplier recorder circuit 100 recodes a multiplier as a quarternary SD number using the 2-bit Booth method and is the same as multiplier recoder circuit 100 of FIG. 7. Odd partial product generator 101 generates from odd recoded digits of the multiplier and the multiplicand a partial product in the form of redundant binary numbers (namely, binary SD numbers) where the most significant digit is nonnegative and the other digits are all nonpositive. Even partial product generator 102 generates from even recoded digit of the multiplier (counted from zero) and the multiplicand partial a product in the form of redundant binary numbers where the most significant digit is nonpositive and the other digits are all nonnegative.

First stage redundant adder 121 (FIG. 11) executes addition in the redundant binary number system for the redundant binary numbers described above generated by the even and odd partial product generators 102, 101, respectively. Redundant binary adder 130 forms the second and the successive stages of the adder tree and executes addition in the redundant binary number system for ordinary redundant binary numbers in a manner similar to that of the redundant addition units illustrated in FIGS. 1 and 7. Redundant binary/binary converter 140 converts the redundant binary number obtained as a product into a binary number, and may easily be implemented by a look-ahead adder, etc.

Generation of partial products by the multiplier of FIG. 11 is described next, preceded by a description of a method for expressing inversion of positive and negative signs in redundant binary numbers.

A binary integer $[X_{n-1}X_{n-2}\ldots X_0]_2 (X_i \in \{0,1\})$ of an n-bit 2's complement binary number has a value,
$$x = -X_{n-1} \cdot 2^{n-1} + \sum_{i=0}^{n-2} X_i \cdot 2^i.$$

A Redundant binary number expressed as $[\tilde{X}_{n-1}X_{n-2}\ldots X_0]_{SD2}$ (where $\tilde{X}_{n-1}$ is $-1$ (hereinafter simply indicated as $\bar{1}$) when $X_{n-1}$ is 1 or 0) have a value of X when $X_{n-1}$ is 0. Redundant binary number expressed as $[X_{n-1}\tilde{X}_{n-2}\ldots \tilde{X}_0]_{SD2}$ (where $\tilde{X}_i$ is similar to $\tilde{X}_{n-1}$) have a value of $-X$ (utilizing inversion of positive and negative signs of redundant binary number, which may be accomplished by inversion of the positive and negative signs of each digit). In addition, the inversion of the sign of a redundant binary number may be accomplished by the principle similar to inversion of the positive and negative signs of a 2's complement binary number which may be accomplished by obtaining a 2's complement. Specifically, since $[\bar{X}_{n-1}\bar{X}_{n-2}\ldots \bar{X}_0]_{SD2}$ (where $\bar{X}_i$ is 0 or 1 when $X_i$ is 1 or 0, respectively) has the value, $$-(1 - X_{n-1})2^{n-1} + \sum_{i=0}^{n-2}(1 - X_i)2^i =$$

$$X^{n-1}2^{n-1} - \sum_{i=0}^{n-2} X_i 2^i - 1 = -X - 1,$$

the redundant binary number having a value $-X$ is obtained using the above value $$[\tilde{\bar{X}}_{n-1}\bar{X}_{n-2}\ldots \bar{X}_0]_{SD2}$$

and the supplement of $+1$. For $[\tilde{\bar{X}}_{n-1}\bar{X}_{n-2}\ldots \bar{X}_0]_{SD2}$, the most significant digit is nonpositive (0 or $\bar{1}$) and the other digits are all non-negative. Similarly, since $[\bar{X}_{n-1}\tilde{\bar{X}}_{n-2}\ldots \tilde{\bar{X}}_0]_{SD2}$ has a value $x+1$, it is possible to use $[\bar{X}_{n-1}\tilde{\bar{X}}_{n-2}\ldots \tilde{\bar{X}}_0]_{SD2}$ as the redundant binary number having a value X and thereafter execute supplementation by $-1$. The most significant digit of $[\bar{X}_{n-1}\tilde{\bar{X}}_{n-2}\ldots \tilde{\bar{X}}_0]_{SD2}$ is nonnegative and all the other digits are all nonpositive.

Next, a method is described with reduces hardware requirements by utilizing the above redundant binary numbers as the partial products when the 2-bit Booth method is adopted for the binary multiplier using a redundant binary adder tree. Here, a multiplicand is expressed as $[a_{n-1}a_{n-2}\ldots a_0]_2$ and a multiplier as $[b_{n-1}b_{n-2}\ldots b_0]_2$. For simplification, n is a power of 2. As described above, the multiplier is recoded as a quaternary SD number according to the 2-bit Booth method. The recoded multiplier is expressed as $[b'_{n/2-1}b'_{n/2-2}\ldots b'_0]_{SD4}$ ($b'_j \in \{-2, -1, 0, 1, 2\}$). The partial products are generated as shown in Table 6 for the digit $b'_j$ of the recoded multiplier. When the partial products are generated as shown in Table 6, the most significant digit of the partial product is nonpositive and the other digits are all nonnegative when j is an even number, and the most significant digit is nonnegative and the other digits are all nonpositive when j is an odd number.

For an integer j which has a value ranging from 1 to $n/2-1$, $b'_{j-} = b_{2j+1} \cdot b_{2j} + b_{2j+1} \cdot \overline{b_{2j-1}}$ (j is an even number)
$b'_{j+} = \overline{b_{2j+1}} \cdot b_{2j} + \overline{b_{2j+1}} \cdot b_{2j-1}$ (j is an odd number)
$b'_{j2} = b_{2j+1} \cdot b_{2j} \cdot \overline{b_{2j-1}} + \overline{b_{2j+1}} \cdot \overline{b_{2j}} \cdot b_{2j-1}$
$b'_{j1} = b_{2j} \cdot \overline{b_{2j-1}} + \overline{b_{2j}} \cdot b_{2j-1}$ In the above theoretical expressions, "." represents the logical product (AND), "+" represents the logical sum (OR), "b" represents the logical inverse (NOT) of b.

Figure 12:
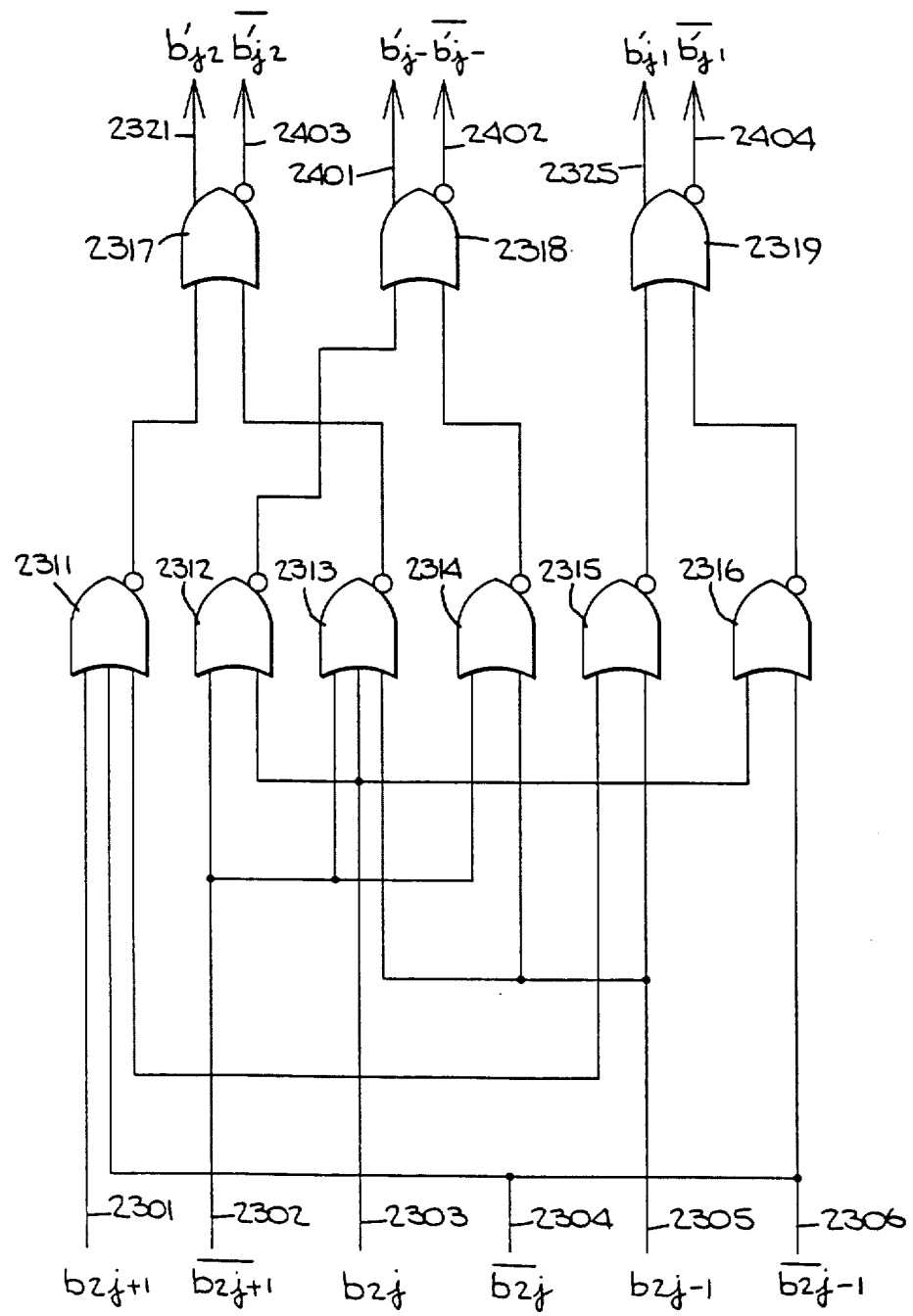
FIG. 12 is a circuit diagram of a multiplier recorder circuit of the multiplier depicted in FIG. 11.

FIG. 12 is a schematic diagram of an embodiment of

TABLE 6

| Digit ($b_j$) of recoded multiplier | Corresponding partial product | |
|---|---|---|
| | j is even number | j is odd number |
| −2 | $[\tilde{A}_{n-1} \overline{A_{n-2}} \overline{A_{n-3}} \ldots \overline{A_0} 1]SD2 + 1$ | $[A_{n-1} \tilde{A}_{n-2} \tilde{A}_{n-3} \ldots \tilde{A}_0 0]SD2 + 0$ |
| −1 | $[\tilde{A}_{n-1} \overline{A_{n-1}} \overline{A_{n-2}} \ldots \overline{A_1} \overline{A_0}]SD2 + 1$ | $[A_{n-1} \tilde{A}_{n-1} \tilde{A}_{n-2} \ldots \tilde{A}_1 \tilde{A}_0]SD2 + 0$ |
| 0 | $[0\ 0\ 0 \ldots 0\ 0]SD2 + 0$ | $[0\ 0\ 0 \ldots 0\ 0]SD2 + 0$ |
| 1 | $[\tilde{A}_{n-1} A_{n-1} A_{n-2} \ldots A_1 A_0]SD2 + 0$ | $[\overline{A_{n-1}} \tilde{A}_{n-1} \tilde{A}_{n-2} \ldots \tilde{A}_i \tilde{A}_0]SD2 + \overline{1}$ |
| 2 | $[\tilde{A}_{n-1} A_{n-2} A_{n-3} \ldots A_0 0]SD2 + 0$ | $[\overline{A_{n-1}} \tilde{A}_{n-2} \tilde{A}_{n-3} \ldots \tilde{A}_0 \overline{1}]SD2 + \overline{1}$ |

Circuits implementing the blocks of the multiplier of FIG. 11 will be described next.

An example of a recorded multiplier (a quaternary SD number) and encoding thereof to a redundant binary number which is then supplemented is described below.

A digit $b'_j$ of the recoded multiplier is expressed by the 3-bit binary signal $b'_{j-}$, $b'_{j2}$, $b'_{j1}$ or $b'_{j+}$, $b'_{j2}$, $b'_{j1}$ shown in Table 7, and a digit $x_i$ of a redundant binary number by the 2-bit binary signals $x_{i+}$, $x_{i-}$ shown in Table 8.

TABLE 7

| $b'_j$ | $b'_{j-}$ | $b'_{j2}$ | $b'_{j1}$ | $b'_{j+}$ |
|---|---|---|---|---|
| −2 | 1 | 1 | 0 | 0 |
| −1 | 1 | 0 | 1 | 0 |
| 0 | 0 | 0 | 0 | 0 |
| 1 | 0 | 0 | 1 | 1 |
| 2 | 0 | 1 | 0 | 1 |

TABLE 8

| $x_i$ | $x_{i+}$ | $x_{i-}$ |
|---|---|---|
| −1 | 0 | 1 |
| 0 | 0 | 0 |
| 1 | 1 | 0 |

However, the (j)th digit $b'_j$ of the recoded multiplier is expressed by the 3-bit signal $b'_{j-}$, $b'_{j2}$, $b'_{j1}$, when j is even number or by the 3-bit signal $b'_{j+}$, $b'_{j2}$, $b'_{j1}$ when j is an odd number.

When encoding into the binary number is carried as described above, the j(th) digit $b'_j$ of the recoded multiplier is determined in the cell of the multiplier recoder by the following expressions.

$b'_{0-} = b_1$
$b'_{02} = b_1 \cdot \overline{b_0}$
$b'_{01} = b_0$ a cell of multiplier recoder circuit 100 of FIG. 11 for recoding a multiplier, specifically for the case of j set for even numbers, and utilizing NOR/OR functions. Gates 2311 through 2319 are NOR/OR composite circuits. Signals 2301 ($b_{2j+1}$), 2303 ($b_{2j}$), 2305 ($b_{2j-1}$) are 1-bit binary signals indicating, respectively, the (2j+1)th digit, (2j)th digit and (2j−1)th digit of the multiplier. Signals 2302 ($\overline{b_{2j+1}}$), 2304 ($\overline{b_{2j}}$), 2306 ($\overline{b_{2j-1}}$) are 1-bit binary signals which are logical inversions (NOT) of signals 2301 ($b_{2j+1}$), 2303 ($b_{2j}$) and 2305 ($b_{2j-1}$), respectively.

Output signals 2401 ($b'_{j-}$), 2321 ($b'_{j2}$) and 2325 ($b'_{j1}$) form a 3-bit signal which represents recoded multiplier $b'_j$. Output signals 2402 ($\overline{b'_{j-}}$), 2403 ($\overline{b'_{j2}}$) and 2404 ($\overline{b'_{j1}}$) form a 3-bit signal in which each of the bits is the logical inverse (NOT) of the corresponding bit of the 3-bit multiplier signal 2401, 2321 and 2325. FIG. 12 illustrates a cell for the multiplier recoder circuit when j is an even number. When j is odd number, the cell for the multiplier recoder circuit may similarly be easily formed.

Partial product generators 101, 102 will be described next.

When the results of some computations conducted previously including supplementation (i.e., addition of 1 or −1) to the lower order digit are obtained as a partial product, supplementation in the second and succeeding stages of the adder tree becomes easier. Specifically, during generation of partial products for the digits $b'_j$ of the recoded multiplier, when j is even number, the two least significant digits are computed and supplementation is carried out on the third least significant digit. When j is odd number, the least significant digit is computed and supplementation is carried on the second least significant digit.

In that case, the i(th) digit of the partial product corresponding to the (j)th digit $b'_j$ of the recoded multiplier is determined by the following theoretical expressions.
When j is even number, $$x_{nj-} = \overline{b'_{j-}} \cdot (b'_{j2} + b'_{j1}) \cdot a_{n-1} + b'_{j-} \cdot \overline{a_{n-1}}$$

For $i = 2 \sim n - 1$, $$x_{ij+} = \overline{b'_{j-}} \cdot (b'_{j2} \cdot a_{i-1} + b_{j1} \cdot a_i) + b'_{j-} \cdot \overline{(b'_{j2} \cdot a_{i-1} + b'_{j1} \cdot a_i)}$$

$$x_{ij+} = b'_{j2} \cdot a_0 + \overline{b'_{j-}} \cdot b_1 \cdot a_1 + b'_{j-} \cdot \overline{a_1 \cdot a_0} + b'_{j-} \cdot \overline{b'_{j1} \cdot a_1 \cdot a_0}$$

$$x_{0j} = b'_{j1} \cdot a_0$$

$$c_{2j+} = \overline{b'_{j-}} \cdot b_{j2} \cdot a_0 \cdot b'_{j-} \cdot \overline{a_1} \cdot \overline{a_0}$$

When $j$ is an odd number, $$x_{nj+} = \overline{b'_{j+}} \cdot (b'_{j2} + b'_{j1}) a_{n-1} + b'_{j+} \cdot \overline{a_{n-1}}$$

For $i = 1 \sim n - 1$, $$x_{i+j} = b'_{j+} \cdot \overline{(b'_{j2} \cdot a_{i-1} + b'_{j1} \cdot a_i)} + b'_{j+} \cdot (b'_{j2} \cdot a_{i-1} + b'_{j1} \cdot a_i)$$

$$x_{0j} = b'_{j1} \cdot a_0$$

$$c_{1j-} = b'_{j+} \cdot b'_{j2} + b'_{j+} b'_{j1} \cdot a_0$$

However, $c_{2j+}$ and $c_{1j-}$, indicating supplementation, are added in the second and successive stages of the adder tree.

Figure 13:
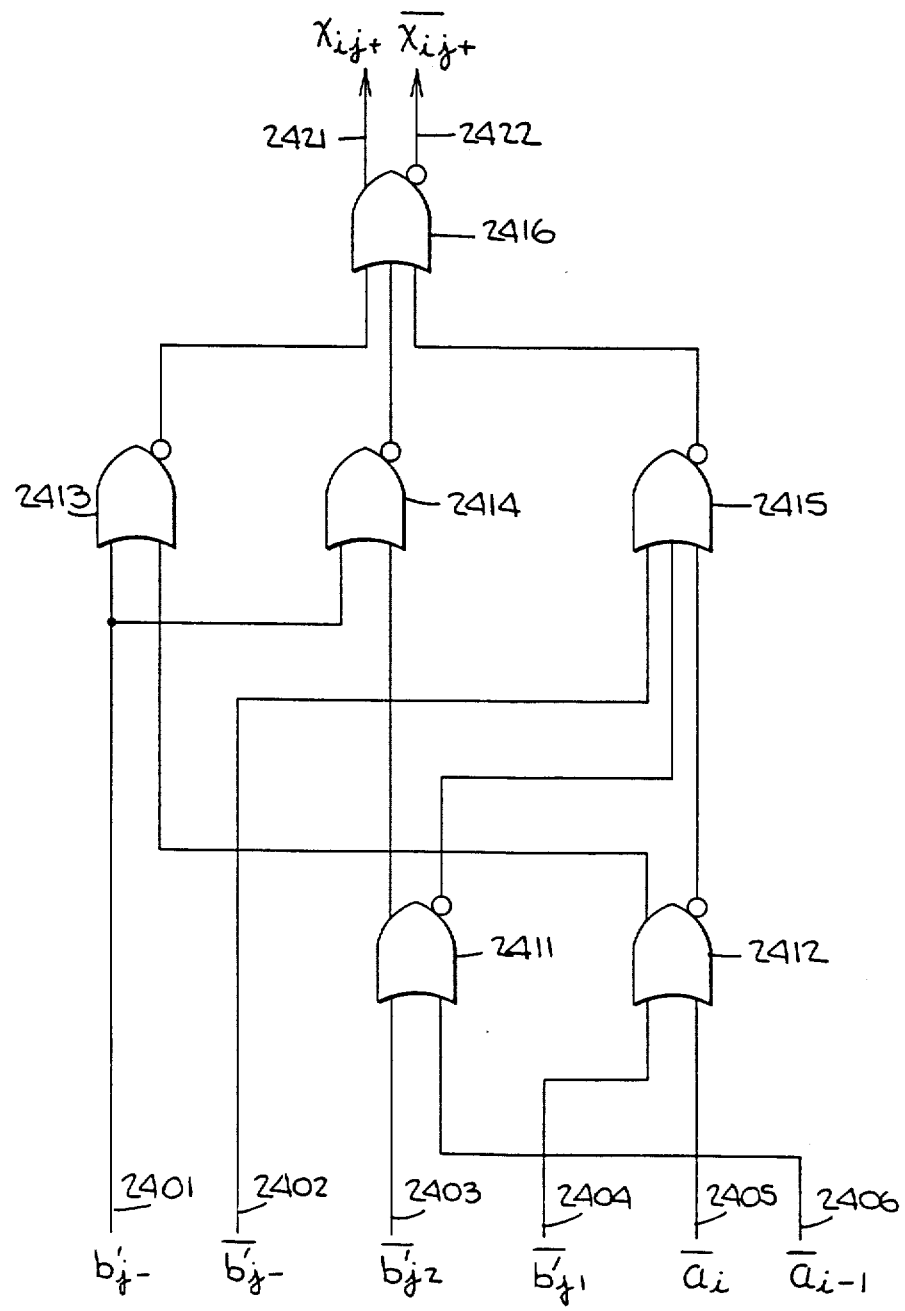
FIG. 13 is a circuit diagram of a cell forming part of the even partial product generator of the multiplier depicted in FIG. 11.

FIG. 13 is a schematic diagram of a cell for partial product utilizing NOR/OR functions which forms the even partial product generator 102 of FIG. 11. Gates 2411 through 2416 are NOR/OR composite circuits. Signal 2401 ($b'_{j-}$) is a 1-bit element of the 3-bit signal which represents the (j)th digit $b'_j$ of the recoded multiplier. Signals 2402 ($\overline{b'_{j-}}$), 2403 ($\overline{b'_{j2}}$) and 2404 ($\overline{b'_{j1}}$) are the logical inverses (NOT) of the individual bits of the 3-bit signal representing $b'_j$. Output signal 2421 ($x_{ij+}$) is one bit of the 2-bit signal representing the i(th) digit of the partial product corresponding to the j(th) digit of the recoded multiplier. Output signal 2422 ($\overline{x_{ij+}}$) is the logical inverse (NOT) of $x_{ij+}$. However, "i" is an integer ranging from 2 to n−1, and the remaining one bit $x_{ij-}$ of the two bit signal is always zero. Similarly, a cell for generating partial products for the case i=0, 1, n may also be easily formed. In addition, a cell for generating the partial product which forms the odd partial product generator 101 may be formed with a similar circuit.

The first stage redundant binary adder 121 is described next. Since the augend is nonnegative and the addend is nonpositive for almost all digits, a carry is not generated at all during addition in the first stage redundant binary adder 121, which simplifies the addition cell. Addition is carried out in accordance with Table 9.

TABLE 9

| Augend ($x_i$) | Addend ($y_i$) | |
|---|---|---|
|  | −1 | 0 |
| 0 | −1 | 0 |
| 1 | 0 | +1 |

Addition of the i(th) digit is determined by the following expressions.

$$Z_{i+} = x_{i+} \cdot \overline{y_{i-}}$$

$$Z_{i-} = \overline{x_{i+}} \cdot y_{i-}$$

where $x_{i+}$ is a 1-bit signal which represents the augend $x_i$, and $y_{i-}$ is a 1-bit signal which represents the addend $y_i$.

Figure 14:
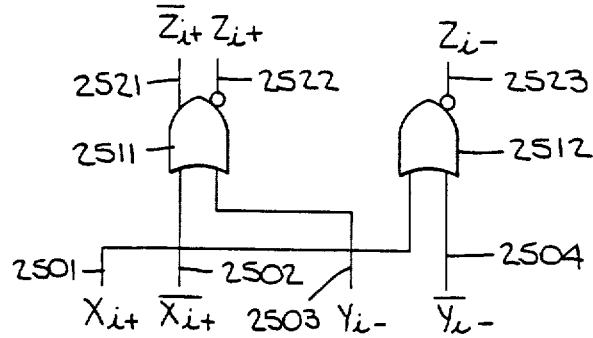
FIG. 14 is a circuit diagram of a first stage addition cell.

FIG. 14 is a schematic diagram of an addition cell utilizing NOR/OR functions which forms the first stage of first redundant binary adder 121 of FIG. 11. Gates 2511 and 2512 are NOR/OR composite circuits. Signal 2501 ($x_{i+}$) is a 1-bit signal which represents the i(th) digit $x_i$ of the addend of a redundant binary expression having all nonnegative digits. Signal 2502 ($\overline{x_{i+}}$) is the logical inverse (NOT) of signal $x_{1+}$. Signal 2503 ($y_{i+}$) is a 1-bit signal which represents the i(th) digit $y_i$ of the addend of a redundant binary expression having all non-positive digits. Signal 2504 ($\overline{y_{i-}}$) is the logical inverse (NOT) of signal 2503 ($Y_{i-}$). Output signals 2522 ($Z_{i+}$) and 2523 ($Z_{i-}$) form a 2-bit signal which represents the (i)th digit $Z_i$ of the redundant binary number obtained as a result of addition. Output signal 2521 ($\overline{Z_{i+}}$) is the logical (NOT) of signal 2522 ($Z_{i+}$).

Redundant binary adder 130 of FIG. 11 is described next.

Addition in redundant adder 130 proceeds in accordance with Table 3 above. Addition at the (i)th digit is determined by the following expressions.

$$x_{id} = x_{i+} + x_{i-}$$

$$x_{id} = y_{i+} + y_{i-}$$

$$p_i = x_{i-} \cdot y_{i-}$$

$$u_i = (x_{id} \cdot y_{id} \cdot p_{i-1} + \overline{x_{id}} \cdot \overline{y_{id}} \cdot \overline{p_{i-1}}) \cdot (x_{i+} \cdot y_{id} + x_{id} \cdot y_{i+})$$

$$t_i = x_{id} \cdot y_{id} \cdot p_{i-1} + \overline{x_{id}} \cdot \overline{y_{id}} \cdot \overline{p_{i-1}} + $$

$$x_{id} \cdot y_{id} \cdot p_{i-1} + \overline{x_{id}} \cdot \overline{y_{id}} \cdot \overline{p_{i-1}}$$

$$z_{i+} = t_i \cdot u_{i-1}$$

$$z_{i-} = \overline{t_i} \cdot \overline{u_{i-1}}$$

Figure 15:
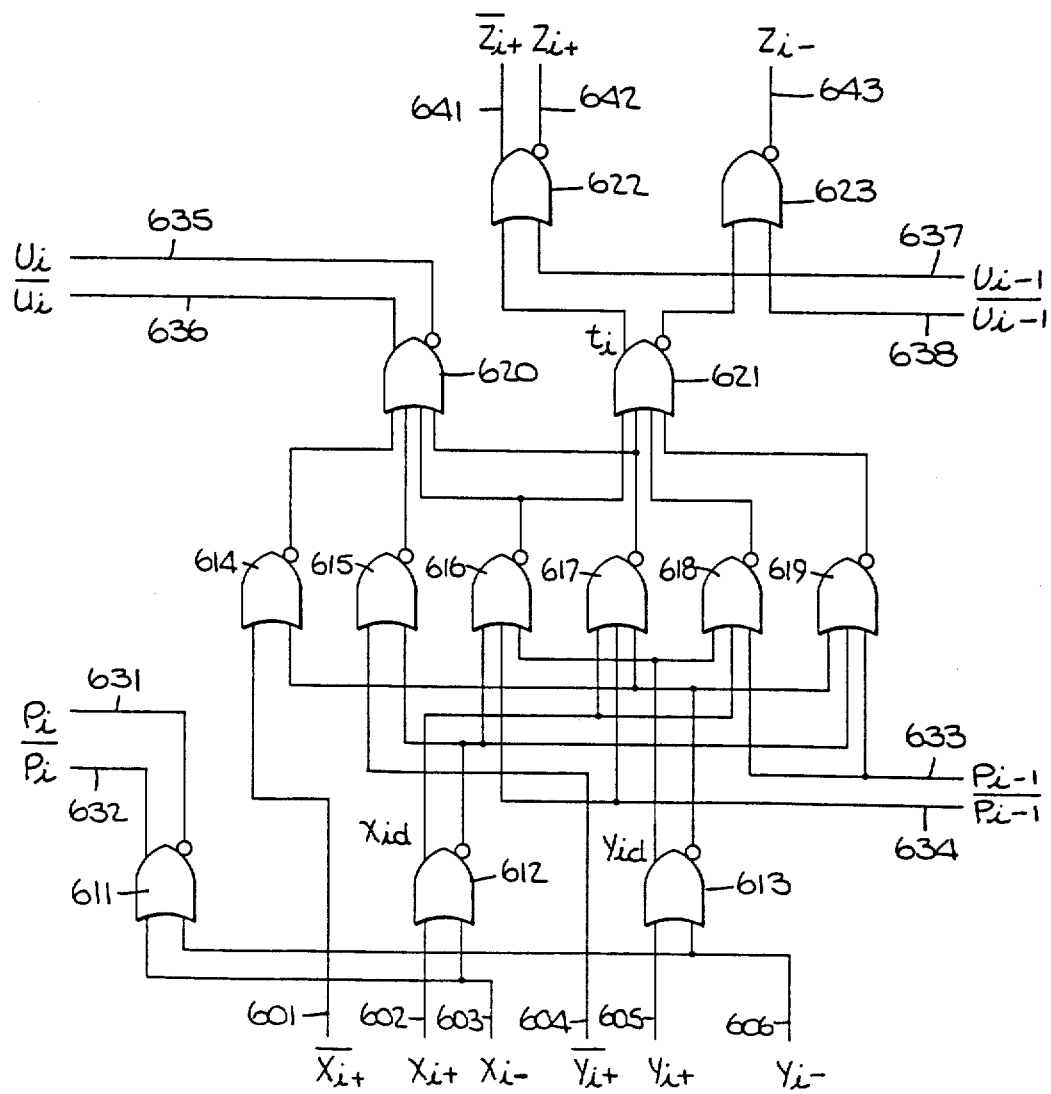
FIG. 15 is a circuit diagram of a second and successive stage addition cell.

FIG. 15 is a schematic diagram of an addition cell utilizing NOR/OR functions which forms part of redundant binary adder 130 of FIG. 11. Gates 611 through 623 are NOR/OR circuits. Signals 602 ($x_{i+}$) and 603 ($x_{i-}$) form a 2-bit signal which represents the (i)th digit $x_i$ of a redundant binary number augend. Signal 601 ($\overline{x_{i+}}$) is a 1-bit signal representing the logical inversion (NOT) of signal 602 ($x_{i+}$). Signals 605 ($y_{i+}$) and 606 ($y_{i-}$) form a 2-bit signal which represent the (i)th digit $y_i$ of the redundant binary number addend. Signal 604 ($\overline{y_{i+}}$) is a 1-bit signal which represents the logical inverse (NOT) of signal 605 ($y_{i+}$). Output signal 631 ($P_i$) indicates whether or not the (i)th digit of the augend ($x_i$) and the (i)th digit of the addend ($y_i$) are all nonnegative. Output signal 633 ($P_{i-1}$) indicates whether or not the (i−1)th digit of the augend ($x_{i-1}$) and the (i−1)th digit of the addend ($y_{i-1}$) are all nonnegative. Output signals 632 ($\overline{P_i}$) and 634 ($\overline{P_{i-1}}$) are logical inversions (NOT) of signals 631 ($p_i$) and 633 ($p_{i-1}$), respectively. Output signal 635 ($u_i$) is a 1-bit signal related to the intermediate carry at the (i)th digit, and output signal 636 ($\overline{u_i}$) is the logical inverse (NOT) of signal 635 ($u_i$). Output signal 637 ($u_{i-1}$) is related to the intermediate carry for the (i−1)th digit, and output signal 638 ($\overline{u_{i-1}}$) is the logical inverse (NOT) of signal 637 ($u_{i-1}$). Output signals 642 ($z_{i+}$) and 643 ($z_{i-}$) form a 2-bit signal representing the (i)th digit $z_i$ of the result of addition. Output signal 641 ($\overline{z_{i+}}$) is the logical inverse (NOT) of signal 642 ($z_{i+}$).

While embodiments of multipliers utilizing a redundant binary adder tree have been described above, multipliers may also be formed utilizing the multi-bit Booth method or signed digit numbers of higher radices. In addition, the present invention can also be applied to multipliers utilizing the Wallace tree or array multipliers, etc.

According to the present invention, since the number of partial products may be reduced to almost half of that in the Booth method of the prior art by providing a redundant subtraction unit having simplified structure, the following advantages are achieved: the number of adder tree stages may be reduced by one in the multiplier by, for example, utilizing the redundant binary adder tree; processing time may be shortened by the time equivalent of 2–3 gate stages; and the number of elements required can be reduced by about 40%.

The present invention provides two kinds of partial product generating methods and is capable of substantially reducing the number of partial products by providing a subtraction circuit of simplified construction, which:

(1) enables the number of elements in the arithmetic processor to be reduced;

(2) high speed operation of the arithmetic processor to be achieved;

(3) comparatively simple circuit structure to be utilized;

(4) the arithmetic processor to be mounted easily and economically on an LSI chip.

What is claimed is:

1. A multiplier circuit for generating a product from inputs corresponding to a binary multiplicand and a binary multiplier, said multiplier circuit comprising:
   (a) a plurality of even intermediate partial product generators each of which receives two or more digits of said binary multiplier and said binary multiplicand and determines therefrom a first intermediate partial product;
   (b) a plurality of odd intermediate partial product generators each of which receives two or more digits of said binary multiplier and said binary multiplicand and determines therefrom a second intermediate partial product;
   (c) a plurality of partial product generators each of which receives one said first intermediate partial products and one said second intermediate partial products and determines therefrom a partial product which corresponds to an integer times said multiplicand; and
   (d) a plurality of addition means forming stages of an adder tree, each stage of which receives two of said partial products and outputs generated by other stages of said adder tree, and determines therefrom a final product.

2. A multiplier circuit in accordance with claim 1, wherein the number of said even intermediate partial product generators is equal to the number of said odd intermediate partial product generators.

3. A multiplier circuit for generating a product from inputs corresponding to a binary multiplicand and a binary multiplier comprising:
   (a) a plurality of even recoders each of which recodes two or more digits of said binary multiplier and determine therefrom a recoded even digit of said binary multiplier expressed as a signed-digit number;
   (b) a plurality of odd recoders each of which recodes two or more digits of said binary multiplier and determines therefrom a recoded odd digit of said binary multiplier expressed as a signed-digit number;
   (c) a plurality of even intermediate partial product generators each of which receives a different even digit of said recoded binary multiplier and said binary multiplicand, determining therefrom an even intermediate partial product;
   (d) a plurality of odd intermediate partial product generators, each of which receives a different odd digit of said recoded binary multiplier and said binary multiplicand, determining therefrom an intermediate partial product;
   (e) a plurality of partial product generators each of which receives one of said even intermediate partial products and one of said odd intermediate partial products and determines therefrom a partial product which corresponds to an integer times said multiplicand; and
   (f) a plurality of addition means forming an adder tree each of which receives two of said partial products and outputs generated by other stages of said adder tree, and determines therefrom a final product.

4. A multiplier circuit in accordance with claim 3 wherein the number of said even recoders and that of said odd recoders, and the number of said even intermediate partial products and that of said odd intermediate partial products are approximately equal to each other respectively.

5. A multiplier circuit in accordance with claim 4 wherein said odd recoders further comprise means for inverting the sign of said recoded odd digit of said binary multiplier, and wherein each of said partial product generators includes a subtraction unit which performs subtraction between said even intermediate partial products and said odd intermediate partial products input thereto.

6. A multiplier circuit in accordance with claim 4, wherein each said even recoders recodes three digits $y_{2j}$, $y_{2j+1}$, $Y_{2j+2}$ of said multiplier corresponding to different value of the index j to a quaternary signed digit number $b_j$ determined by the arithmetic formula, $b_j = (y_{2j} + y_{2j+1} - 2y_{2j+2})$ where j is 0 or even; wherein each said odd recoders recodes three digits $y_{2j}$, $y_{2j+1}$, $y_{2j+2}$ of said multiplier corresponding to a different value of the index j to a quaternary signed digit number $b_j$ determined by the arithmetic formula $b_j = (2y_{2j+2} - y_{2j+1} - y_{2j})$ where j is odd; wherein each of said partial product generators includes a subtraction unit which subtracts each odd digit $b_j$ of said odd intermediate partial product from each even digit $b_j$ of said even intermediate partial product input thereto and generates therefrom a binary signed-digit number; and wherein said addition means includes at least one adder which receives two of said binary signed-digit numbers and determines therefrom a sum in the form of a binary signed-digit number.

7. A multiplier circuit in accordance with claim 6, wherein, said even intermediate partial product generators or said odd intermediate partial product generators, output a number which is the logical negation of each digit of the corresponding intermediate partial product determined therein, when a recoded digit of said multiplier having a negative value is input thereto; and wherein at least some of said partial product generators and said addition means receive a correction term corresponding to plus one or minus one which is applied to the least significant digit of said partial products input thereto.

8. A multiplier circuit in accordance with claim 6, which further includes means to convert a binary signed-digit number obtained as a product into a binary number.

9. A multiplier circuit in accordance with claim 6 which further includes means to convert a signed-digit number obtained as a final product into a binary number.

10. A multiplier circuit in accordance with claim 3 wherein said odd recoders further comprise means for inverting the sign of said recoded odd digit of said binary multiplier, and wherein each of said partial product generators includes a subtraction unit which performs subtraction between said even intermediate partial product and said odd intermediate partial product input thereto.

11. A multiplier circuit in accordance with claim 2, wherein each said even recoders recodes three digits $y_{2j}$, $y_{2j+1}$, $Y_{2j+2}$ of said multiplier corresponding to different value of the index j to a quaternary signed digit number $b_j$ determined by the arithmetic formula, $b_j=(y_{2j}+y_{2j+1}-2y_{2j+2})$ where j is 0 or even; wherein each said odd recoders recodes three digits $y_{2j}$, $y_{2j+1}$, $y_{2j+2}$ of said multiplier corresponding to a different value of the index j to a quaternary signed digit number $b_j$ determined by the arithmetic formula $b_j=(2y_{2j+2}-y_{2j+1}-y_{2j})$ where j is odd; wherein each of said partial product generators includes a subtraction unit which subtracts each odd digit $b_j$ of said odd intermediate partial product from each even digit $b_j$ of said even intermediate partial product input thereto and generates therefrom a binary signed-digit number; and wherein said addition means includes at least one adder which receives two of said binary signed-digit numbers and determines therefrom a sum in the form of a binary signed-digit number.

12. A multiplier circuit in accordance with claim 11, wherein, said even intermediate partial product generators or said odd intermediate partial product generators, output a number which is the logical negation of each digit of the corresponding intermediate partial product determined therein, when a recoded digit of said multiplier having a negative value is input thereto; and wherein at least some of said partial product generators and said addition means receive a correction term corresponding to plus one or minus one which is applied to the least significant digit of said partial products input thereto.

13. A multiplier circuit in accordance with claim 11, which further includes means to convert a binary signed-digit number obtained as a product into a binary number.

14. A multiplier circuit in accordance with claim 11 which further includes means to convert a signed-digit number obtained as a final product into a binary number.

15. A multiplier circuit for generating a product from inputs corresponding to a binary multiplicand and a binary multiplier, comprising:
(a) a plurality of recoders each of which recodes two or more digits of said binary multiplier and generates a recoded mutliplier digit as a signed-digit number;
(b) a plurality of first means, each of which receives an even recoded multiplier digit and said multiplicand and determines therefrom a first signed-digit intermediate partial product in which the most significant digit is non-positive and all other digits are non-negative;
(c) a plurality of second means, each of which receives an odd recoded multiplier digit and said multiplicand and determines therefrom a second signed-digit intermediate partial product in which the most significant digit is non-negative and all other digits are non-positive; and
(d) a plurality of addition means each of which receives said first and second signed-digit intermediate partial products and determines therefrom a signed-digit partial product which is the sum thereof; and
(e) a plurality of signed-digit adders forming an adder tree each of which receives the signed-digit partial products from two of said addition means and outputs generated by higher stages of said adder tree, to determine therefrom a final product.

16. A multiplier circuit in accordance with claim 3, wherein, said even intermediate partial product generators or said odd intermediate partial product generators, output a number which is the logical negation of each digit of the corresponding intermediate partial product determined therein, when a recoded digit of said multiplier having a negative value is input thereto; and wherein at least some of said partial product generators and said addition means receive a correction term corresponding to plus one or minus one which is applied to the least significant digit of said partial products input thereto.

17. A multiplier circuit in accordance with claim 15, wherein the number of said first means, that of the said second means and that of said addition means are approximately equal to each other.

18. A multiplier circuit in accordance with claim 17 wherein said first means outputs a first complement number whose digits are the logical negation of each digit of said first signed-digit intermediate partial product when said even recoded multiplier digit received thereby is negative in value; wherein said second means outputs a second complement number whose digits are the sign-inverted digits of the logical negation of each digit of said second signed-digit intermediate partial product, when said odd recoded multiplier digit received thereby is positive in value; and wherein at least some of said addition means receive a correction term corresponding to plus one or minus one which is applied to the least significant digit or to the second least significant digit of said first and second complementary numbers input thereto.

19. A multiplier circuit in accordance with claim 15 wherein said first means outputs a first complement number whose digits are the logical negation of each digit of said first signed-digit intermediate partial product when said even recoded multiplier digit received thereby is negative in value; wherein said second means outputs a second complement number whose digits are the sign-inverted digits of the logical negation of each digit of said second signed-digit intermediate partial product, when said odd recoded multiplier digit received thereby is positive in value; and wherein at least some of said addition means receive a correction term corresponding to plus one or minus one which is applied to the least signficiant digit or to the second least significant digit of said first and second complementary numbers input thereto.

20. A multiplier circuit for generating a product from inputs corresponding to a binary multiplicand and a binary multiplier comprising:

(a) a plurality of recoders each of which recodes two or more digits of said binary multiplier and generates a recoded multiplier digit as a signed-digit number;

(b) a plurality of first means each of which receives an odd recoded multiplier and said multiplicand and determines therefrom a first signed-digit intermediate partial product in which the most significant digit is non-positive and all other digits non-negative;

(c) a plurality of second means each of which receives an even recoded multiplier digit and said multiplicand and determines thereby a second signed-digit intermediate partial product in which the most significant digit is non-negative and all other digits are non-positive;

(d) a plurality of addition means each of which receives said first and second signed-digit intermediate partial products and determines therefrom a signed-digit partial product which is the sum thereof; and (e) a plurality of signed-digit adders forming an adder tree each of which receives the signed-digit partial products from two of said addition means and outputs generated by higher stages of said adder tree to determine therefrom a final product.

21. A multiplier circuit in accordance with claim 20 wherein the numbers of said first means, that of the said second means and that of the said addition means are approximately equal to each other.

22. A multiplier circuit for generating a product from inputs corresponding to a binary multiplicand and a binary multiplier comprising:

(a) a plurality of recoders each of which recodes two or more digits of said multiplier and generates a recoded multiplier digit expressed as a signed-digit number;

(b) a plurality of partial product generators each of which receives two recoded multiplier digits and said multiplicand and determines therefrom a partial product expressed as a signed-digit number; and (c) a plurality of signed-digit adders forming stages of an adder tree, each of which receives two of said partial products and an output generated by some of the higher stages of said adder tree.

23. A multiplier circuit in accordance with claim 22 wherein each of said partial product generators further includes:

(a) a first intermediate partial product generating means for receiving the lower order digit of two recoded multiplier digits and said multiplicand, determining therefrom a first intermediate partial product and providing as an output the sign inversion of each digit of said first intermediate partial product when said lower order digit is negative;

(b) a second intermediate partial product generating means for receiving the higher order digit of said two recoded multiplier digits and said multiplicand, determining therefrom a second intermediate partial product and providing as an output a number obtained by the sign inversion of each digit of said second intermediate partial product when said lower order digit is positive and said higher order digit is negative, or a number which is the two's complement of said second intermediate partial product when said lower order digit and said higher order digit are negative, or a number obtained by sign inversion of each digit of the two's complement of said second intermediate partial product when said lower order digit and said higher order digit are positive; and (c) an addition means for receiving said outputs from said first and second intermediate partial product generating means and determining therefrom a final product.

24. A multiplier circuit in accordance with claim 23 wherein said second intermediate partial product generating means outputs both a number obtained by the logical negation of each digit of the intermediate partial product determined therein and a correction term when said lower order digit and said higher order digit are both negative, or generates the logic negation of each digit of said intermediate partial product determined therein and outputs both a number obtained by the sign inversion of each logically negated digit and a correction term when said lower order digit and said higher order digit are both positive; and wherein said correction term so generated by said second intermediate partial product generating means in output to said addition means.

* * * * *

UNITED STATES PATENT AND TRADEMARK OFFICE
CERTIFICATE OF CORRECTION

PATENT NO. : 4,864,528
DATED : September 5, 1989
INVENTOR(S) : Tamotsu Nishiyama, Shigeo Kuninobu, Naofumi Takagi, and Takahi Taniguchi It is certified that error appears in the above-indentified patent and that said Letters Patent is hereby corrected as shown below:

Col. 4, line 43, "recorder" should be "recoder"

Col. 5, line 23 "$-y_n^{2n-1}$" should be "$-y_n 2^{n-1}$"

"$y_i^{2^{i-1}}$" should be "$-y_i 2^{i-1}$"

line 31 "$)^{2^{2i}}$" should be "$)\cdot 2^{2i}$"

line 33 "$)^{2^{4k}}$" should be "$)\cdot 2^{4k}$"

line 35 "$)^{2^{4k+2}}$" should be "$)\cdot 2^{4k+2}$"

line 42 "x $2^{4k}$" should be "X $2^{4k}$"

line 44 "x $2^{4k+2}$" should be "X $2^{4k+2}$"

line 48 "x $2^{2j}$" should be "X $2^{2j}$"

line 53 "x $2^{2j}$" should be "X $2^{2j}$"

Col. 6, line 42 "$y_2 \overline{y_1}$" should be "$y_2 \cdot y_1$"

UNITED STATES PATENT AND TRADEMARK OFFICE
CERTIFICATE OF CORRECTION

PATENT NO. : 4,864,528
DATED : September 5, 1989
INVENTOR(S) : Tamotsu Nishiyama It is certified that error appears in the above-indentified patent and that said Letters Patent is hereby corrected as shown below:

Col. 8, line 3   "recorded" should be "recoded"

line 5   "$b_j^5$" should be "$b_j^s$"

Col. 7, line 25   "2j" should be "$2^j$"

line 50   "recorded" should be "recoded"

line 53   "$\cdot \overline{x_n}$" should be "$\cdot x_n$"

line 55   "$b_j^5$" should be "$\overline{b_j^s}$"

"$x_n$" should be "$\overline{x_n}$"

line 57   "$b_j x_1$" should be "$b_j^1 \cdot x_1$"

line 58   "$z_1$" should be "$z_1$"

Col. 8, line 49   "$z_1$" should be "$\overline{z_1}$"

line 51   "$z_1$" should be "$\overline{z_1}$"

"$(z_1 + w_{1-2})$" should be "$\overline{(\overline{z_1} + w_{1-2})}$"

"$r_i^a =$" should be "or, $r_i^a =$"

UNITED STATES PATENT AND TRADEMARK OFFICE
CERTIFICATE OF CORRECTION

PATENT NO. : 4,864,528

DATED : September 5, 1989

INVENTOR(S) : Tamotsu Nishiyama, Shigeo Kuniobu, Naofumi Takagi, and Takashi Taniguchi It is certified that error appears in the above-indentified patent and that said Letters Patent is hereby corrected as shown below:

Col. 9, line 33   "$x_2-c_2$" should be "$x_2 \cdot c_2$"

line 35   "$c_2$" should be "$-c_2$"

line 36   "to partial" should be "to a partial"

UNITED STATES PATENT AND TRADEMARK OFFICE
CERTIFICATE OF CORRECTION

PATENT NO. : 4,864,528     Page 4 of 11
DATED : September 5, 1989
INVENTOR(S) : Tamotsu Nishiyama, Shigeo Kuninobu, Naofumi Takagi, and Takashi Taniguchi It is certified that error appears in the above-indentified patent and that said Letters Patent is hereby corrected as shown below:

Col. 9, line 47, Table 3

| Type | Augend ($x_i$) | Addend ($y_i$) | Next lower digit ($x_{i-1}, y_{i-1}$) | Carry ($c_i$) | Intermediate sum ($s_i$) |
|---|---|---|---|---|---|
| <1> | 1 | 1 | — | 1 | 0 |
| <2> | 1 | 0 | Both are not negative. | 1 | -1 |
|     | 0 | 1 | At least one is negative. | 0 | 1 |
| <3> | 0 | 0 | — | 0 | 0 |
| <4> | 1 | -1 | — | 0 | 0 |
|     | -1 | 1 | — | 0 | 0 |
| <5> | 0 | -1 | Both are not negative | 0 | -1 |
|     | -1 | 0 | At least one is negative | -1 | 1 |
| <6> | -1 | -1 | — | -1 | 0 | should be

| Type | Augend ($x_i$) | Addend ($y_i$) | Next lower digit ($x_{i-1}, y_{i-1}$) | Carry ($c_i$) | Intermediate sum ($s_i$) |
|---|---|---|---|---|---|
| <1> | 1 | 1 | — | 1 | 0 |
| <2> | 1 | 0 | Both are not negative. | 1 | -1 |
|     | 0 | 1 | At least one is negative. | 0 | 1 |
| <3> | 0 | 0 | — | 0 | 0 |
| <4> | 1 | -1 | — | 0 | 0 |
|     | -1 | 1 | — | 0 | 0 |
| <5> | 0 | -1 | Both are not negative | 0 | -1 |
|     | -1 | 0 | At least one is negative | -1 | 1 |
| <6> | -1 | -1 | — | -1 | 0 |

UNITED STATES PATENT AND TRADEMARK OFFICE
CERTIFICATE OF CORRECTION

PATENT NO. : 4,864,528

DATED : September 5, 1989

INVENTOR(S) : Tamotsu Nishiyama, Shigeo Kuninobu, Naofumi Takagi, and Takashi Taniguchi It is certified that error appears in the above-indentified patent and that said Letters Patent is hereby corrected as shown below:

Col. 9, line 67  "$\overline{x_i^s + y_i^s}$" should be "$\overline{x_i^s + y_i^s}$."

Col. 10, line 6  "$c_i$" should be "$c_i$."

line 20  "$u_i$" should be "$\overline{u_i}$,"

line 29  "is AND-NOR" should be "is an AND-NOR"

Col. 11, line 19  "$\{S_k \cdot (E_k \cdot X) - S_k (F_k \cdot X \cdot 2^2)\} \cdot 2^{+k}$" should be "$\{S_k \cdot (E_k \cdot X) - S_k \cdot (F_k \cdot X \cdot 2^2)\} \cdot 2^{+k}$"

Col. 13, Table 5, line 1  "RL" should be "$R_L$"

line 4  "$\widetilde{x_0}.^{\wedge}]$" should be "$\widetilde{x_0}, \widetilde{0}]$"

line 5  "$\dfrac{\overline{x_1}}{\overline{x_0}}$" should be "$\dfrac{\overline{x_1}}{\overline{x_0}}$"

UNITED STATES PATENT AND TRADEMARK OFFICE
CERTIFICATE OF CORRECTION

PATENT NO. : 4,864,528
DATED : September 5, 1989
INVENTOR(S) : Tamotsu Nishiyama, Shigeo Kuninobu, Naofumi Takagi, and Takashi Taniguchi It is certified that error appears in the above-indentified patent and that said Letters Patent is hereby corrected as shown below:

Col. 13, line 64  "$\overline{r_H^s \oplus (r_H^1 \cdot x_n + r_H^2 \cdot x_{n-1})}$" should be "$\overline{r_H^s \oplus (r_H^1 \cdot x_n + r_H^2 \cdot x_{n-1})}$"

line 65  "$\oplus \cdot r_H^s$" should be "$\oplus r_H^s$"

Col. 14, line 1  "$a_{n \oplus 1}^a$" should be "$a_{n+1}^a$"

"$r_H^s + (r_H^1$" should be "$r_H^s \oplus (r_H^1$"

line 5  "$r^S H \oplus (r_H^1 \cdot x_{1-2} + r_H^2 \cdot x_{1-3})$" should be "$\overline{r_H^s \oplus (r_H^1 \cdot x_{1-2} + r_H^2 \cdot x_{1-3})}$"

UNITED STATES PATENT AND TRADEMARK OFFICE
CERTIFICATE OF CORRECTION

PATENT NO. : 4,864,528

DATED : September 5, 1989

INVENTOR(S) : Tamotsu Nishiyama, Shigeo Kuninobu, Naofumi Takagi, and Takashi Taniguchi Page 7 of 11

It is certified that error appears in the above-indentified patent and that said Letters Patent is hereby corrected as shown below:

Col. 19, line 5  "$\overline{b_{j\_}'}$" should be "$\overline{b_{j\_}'}$."

"$b_{j1}$" should be "$b_{j1}'$"

line 7  "$x_{ij}$" should be "$x_{1j}$"

"$b_1$" should be "$b_{j1}'$"

"$\overline{a_1 \cdot a_0}$" should be "$\overline{a_1} \cdot a_0$"

line 9  "$\overline{b_{j\_}'}$" should be "$b_{j\_}'$"

"$a_0 \cdot b_j'$" should be "$\overline{a_0} + b_j'$"

line 13  "$b_{j1}'$) $a_{n-1}$" should be "$b_{j1}'$)$\cdot a_{n-1}$"

line 16  "$x_{i+j}$" should be "$x_{ij\_}$"

"$b_j'$" should be "$\overline{b_j'}$"

"$x_{i,j}$" should be "$x_{ij\_}$"

line 18  "$x_{oj}$" should be "$x_{oj\_}$"

line 19  "$b_j' + b_{j1}'$" should be "$b_{j+}' \cdot b_{j\_}'$"

"$a_0$" should be "$\overline{a_0}$"

UNITED STATES PATENT AND TRADEMARK OFFICE
CERTIFICATE OF CORRECTION

PATENT NO. : 4,864,528
DATED : September 5, 1989
INVENTOR(S) : Tamotsu Nishiyama, Shigeo Kuninobu, Naofumi Takagi, and Takashi Taniguchi It is certified that error appears in the above-indentified patent and that said Letters Patent is hereby corrected as shown below:

Col. 14, line 51  "$\overline{r_H^1 x_1}$" should be "$\overline{r_H^1 \cdot x_1}$"

Col. 15, line 30  "may be to" should be "may be"

line 55  "recorder" should be "recoder"

line 66  "partial a" should be "a partial"

line 47  "$X^{n-1}$" should be "$X_{n-1}$"

Col. 17,

Table 6,  "A" should be "a"

line 3  "$\overline{A_{n-2}}$" should be "$\overline{a_{n-2}}$"

"$\overline{A_{n-3}}$" should be "$\overline{a_{n-3}}$"

"$]SD2$" should be "$]_{SD2}$"

line 4  "$\overline{A_{n-1}}$" should be "$\overline{a_{n-1}}$"

"$\overline{A_{n-2}}$" should be "$\overline{a_{n-2}}$"

UNITED STATES PATENT AND TRADEMARK OFFICE
CERTIFICATE OF CORRECTION

PATENT NO. : 4,864,528
DATED : September 5, 1989
INVENTOR(S) : Tamotsu Nishiyama, Shigeo Kuninobu, Naofumi Takagi, and Takashi Taniguchi Page 9 of 11

It is certified that error appears in the above-indentified patent and that said Letters Patent is hereby corrected as shown below:

Col. 17, Table 6, line 4    "]SD2" should be "]$_{SD2}$"

line 5    "]SD2" should be "]$_{SD2}$"

line 6    "$\overline{A_{n-1}}$" should be "$\overline{a_{n-1}}$"

"]SD2" should be "]$_{SD2}$"

"$\widetilde{\overline{A_1}}$" should be "$\widetilde{\overline{a_1}}$"

line 7    "$\overline{A_{n-1}}$" should be "$\overline{a_{n-1}}$"

"]SD2" should be "]$_{SD2}$"

Col. 17, line 33    "recorded" should be "recoded"

line 59    "when j is" should be "when j is an"

line 67    ".$\overline{b_0}$" should be "·$\overline{b_0}$"

Col. 18, line 4    "$b_{2J}$" should be "$\overline{b_{2J}}$"

line 6    "$\overline{b'_{J2}}$" should be "$b'_{J2}$"

"$b_{2J}$" should be "$\overline{b_{2J}}$"

line 11    "b" should be "$\overline{b}$"

UNITED STATES PATENT AND TRADEMARK OFFICE
CERTIFICATE OF CORRECTION

PATENT NO. : 4,864,528

DATED : September 5, 1989

INVENTOR(S) : Tamotsu Nishiyama, Shigeo Kuninobu, Naofumi Takagi, and Takashi Taniguchi It is certified that error appears in the above-indentified patent and that said Letters Patent is hereby corrected as shown below:

Col. 19, line 60   "$\cdot \overline{y_i}$" should be "$\cdot \overline{y_{i\_}}$"

line 61   "$\cdot y_{i\_}$" should be "$\cdot y_{i\_}$"

Table 9, line 4   "+1" should be "1"

Col. 20, line 4   "$y_{i+}$" should be "$y_{i\_}$"

line 8   "$Y_{i\_}$" should be "$y_{i\_}$"

line 24   "$x_{i\_} \cdot y_{i\_}$" should be "$\overline{x_{i\_}} \cdot \overline{y_{i\_}}$"

line 25   "$x_{ia} \cdot y_{ia} \cdot p_{i-1} + x_{ia} \cdot y_{ia} \cdot p_{i-1}$" should be "$\overline{x_{ia} \cdot \overline{y_{ia}} \cdot p_{i-1} + \overline{\overline{x_{ia} \cdot y_{ia} \cdot p_{i-1}}}}$"

"$x_{i+} \cdot y_{ia} + x_{ia} \cdot y_{i+}$" should be "$\overline{x_{i+} \cdot y_{ia} + x_{ia} \cdot y_{i+}}$"

line 27   "$y_{ia}$" should be "$\overline{y_{ia}}$";

"$x_{ia}$" should be "$\overline{x_{ia}}$"

line 29   "$p_{i-1} + x_{ia} \cdot y_{ia} \cdot p_{i-1}$" should be "$\overline{p_{i-1}} + \overline{x_{ia}} \cdot \overline{y_{ia}} \cdot \overline{p_{i-1}}$"

line 30   "$t_i \cdot u_{i-1}$" should be "$\overline{t_i} \cdot \overline{u_{i-1}}$"

line 40   "$x_{i+}$" should be "$\overline{x_{i+}}$"

UNITED STATES PATENT AND TRADEMARK OFFICE
CERTIFICATE OF CORRECTION

PATENT NO. : 4,864,528
DATED : September 5, 1989
INVENTOR(S) : Tamotsu Nishiyama, Shigeo Kuninobu, Naofumi Takagi, and Takashi Taniguchi It is certified that error appears in the above-indentified patent and that said Letters Patent is hereby corrected as shown below:

Col. 22, line 37  "$Y_{2J+2}$" should be "$y_{2J+2}$"

Col. 23, line 15  "2" should be "3"

line 17  "$Y_{2J+2}$" should be "$y_{2J+2}$"

Signed and Sealed this

Fourteenth Day of March, 1995

Attest:

BRUCE LEHMAN

Attesting Officer     Commissioner of Patents and Trademarks